United States Patent
Hayashi et al.

(10) Patent No.: US 9,640,931 B2
(45) Date of Patent: May 2, 2017

(54) ELECTRONIC APPARATUS AND METHOD OF MANUFACTURING ELECTRONIC APPARATUS

(71) Applicant: FUJITSU LIMITED, Kawasaki-shi, Kanagawa (JP)

(72) Inventors: Kazuhiro Hayashi, Fukushima (JP); Tadanori Tachikawa, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/821,130

(22) Filed: Aug. 7, 2015

(65) Prior Publication Data

US 2016/0050780 A1   Feb. 18, 2016

(30) Foreign Application Priority Data

Aug. 15, 2014   (JP) .................................. 2014-165494

(51) Int. Cl.
| | |
|---|---|
| H01R 43/00 | (2006.01) |
| H02G 3/18 | (2006.01) |
| G06F 1/16 | (2006.01) |
| G06F 1/18 | (2006.01) |

(52) U.S. Cl.
CPC ............. *H01R 43/00* (2013.01); *G06F 1/16* (2013.01); *G06F 1/18* (2013.01); *G06F 1/181* (2013.01); *G06F 1/185* (2013.01); *G06F 1/189* (2013.01); *H02G 3/185* (2013.01); G06F 2200/1631 (2013.01)

(58) Field of Classification Search
CPC ... G06F 1/16; G06F 1/18; G06F 1/181; G06F 1/185

USPC .................. 174/71 R, 72 R; 361/825, 826
See application file for complete search history.

(56) References Cited

U.S. PATENT DOCUMENTS

| | | | | |
|---|---|---|---|---|
| 1,827,086 A | * | 10/1931 | Hunter | H02G 3/06 138/129 |
| 1,837,962 A | * | 12/1931 | Hensgen | B23K 1/0008 174/72 A |
| 3,544,192 A | * | 12/1970 | Goldstein | G02B 6/4403 174/117 F |
| 3,808,505 A | * | 4/1974 | Reimer | H05K 1/117 174/254 |
| 3,866,162 A | * | 2/1975 | Florian | G01V 1/201 174/71 R |
| 4,054,353 A | * | 10/1977 | Saunders | H05K 1/189 439/493 |
| 4,237,546 A | * | 12/1980 | Wells | H05K 1/14 361/679.31 |

(Continued)

FOREIGN PATENT DOCUMENTS

| | | |
|---|---|---|
| JP | 8-6672 A | 1/1996 |
| JP | 2005-5320 A | 1/2005 |

*Primary Examiner* — David M Sinclair
*Assistant Examiner* — Theron S Milliser
(74) *Attorney, Agent, or Firm* — Westerman, Hattori, Daniels & Adrian, LLP

(57) ABSTRACT

An electronic apparatus includes: a first case and a second case assembled to each other; a first cable that couples a first component provided in the first case and a second component provided in the second case; and a second cable that couples a pair of members provided in the first case, and provided with a bent section at an intermediate part of the second cable in a longitudinal direction thereof, the second cable supporting the first cable inside the bent section.

19 Claims, 24 Drawing Sheets

(56) References Cited

U.S. PATENT DOCUMENTS

| | | | | |
|---|---|---|---|---|
| 4,587,719 A * | 5/1986 | Barth | H01L 21/84 | 257/522 |
| 4,717,357 A * | 1/1988 | Greenwood | H01R 12/616 | 307/147 |
| 4,974,121 A * | 11/1990 | Masuko | H02G 3/00 | 361/692 |
| 4,978,949 A * | 12/1990 | Herron | G06F 1/1616 | 345/168 |
| 5,051,868 A * | 9/1991 | Leverault | G06F 1/183 | 361/679.6 |
| 5,082,253 A * | 1/1992 | Suzuki | H01B 13/01218 | 269/45 |
| 5,168,429 A * | 12/1992 | Hosoi | G06F 1/1616 | 16/229 |
| 5,196,993 A * | 3/1993 | Herron | F16M 11/10 | 248/923 |
| 5,243,136 A * | 9/1993 | Chen | H01R 31/02 | 174/135 |
| 5,285,349 A * | 2/1994 | Zander | H01R 13/6675 | 174/653 |
| 5,311,397 A * | 5/1994 | Harshberger | G06F 1/183 | 361/679.58 |
| 5,316,491 A * | 5/1994 | Satou | G06F 1/1616 | 439/159 |
| 5,457,600 A * | 10/1995 | Campbell | H01R 25/00 | 307/150 |
| 5,495,389 A * | 2/1996 | Dewitt | G06F 1/18 | 220/255 |
| 5,552,967 A * | 9/1996 | Seto | G06F 1/1616 | 174/387 |
| 5,574,252 A * | 11/1996 | Hill | H05K 5/0226 | 174/51 |
| 5,598,627 A * | 2/1997 | Saka | H01R 12/62 | 174/72 A |
| 5,619,397 A * | 4/1997 | Honda | G06F 1/1632 | 361/679.43 |
| 5,650,910 A * | 7/1997 | Winick | G06F 1/183 | 361/679.6 |
| 5,701,231 A * | 12/1997 | Do | G06F 1/181 | 312/223.2 |
| 5,723,820 A * | 3/1998 | Whitney | H02G 5/061 | 174/71 R |
| 5,835,346 A * | 11/1998 | Albani | G06F 1/184 | 361/679.4 |
| 5,912,807 A * | 6/1999 | Gallagher, Sr. | G06F 1/189 | 174/117 FF |
| 5,973,918 A * | 10/1999 | Felcman | G06F 1/184 | 361/679.6 |
| 6,016,171 A * | 1/2000 | Tsao | G06F 1/1616 | 312/208.4 |
| 6,052,276 A * | 4/2000 | Do | G06F 13/409 | 361/679.4 |
| 6,104,618 A * | 8/2000 | Loibl | H05K 1/118 | 361/749 |
| 6,108,195 A * | 8/2000 | Behl | G06F 1/16 | 248/917 |
| 6,172,881 B1 * | 1/2001 | Hirai | H05K 1/148 | 174/376 |
| 6,272,006 B1 * | 8/2001 | Lee | G06F 1/1616 | 16/342 |
| 6,273,499 B1 * | 8/2001 | Guyon | B60R 16/0215 | 174/72 A |
| 6,392,148 B1 * | 5/2002 | Ueno | B60R 16/0215 | 174/117 F |
| 6,392,875 B1 * | 5/2002 | Erickson | G06F 1/184 | 360/98.08 |
| 6,407,910 B1 * | 6/2002 | Diaz | G06F 1/181 | 312/223.1 |
| 6,445,595 B2 * | 9/2002 | Okamoto | H05K 5/0017 | 174/72 A |
| 6,549,397 B1 * | 4/2003 | Diaz | G06F 1/181 | 312/223.1 |
| 6,560,093 B1 * | 5/2003 | McLeod | G06F 1/16 | 312/223.2 |
| 6,594,147 B2 * | 7/2003 | Heirich | G06F 1/1601 | 165/80.2 |
| 6,603,079 B2 * | 8/2003 | Biron | H05K 1/148 | 174/254 |
| 6,630,625 B1 * | 10/2003 | Akashi | H01R 43/28 | 174/71 R |
| 6,667,891 B2 * | 12/2003 | Coglitore | G06F 1/184 | 361/784 |
| 7,035,085 B2 * | 4/2006 | Lee | G06F 1/181 | 174/101 |
| 7,106,579 B2 * | 9/2006 | Maskatia | G06F 1/1618 | 312/223.1 |
| 7,187,561 B2 * | 3/2007 | Chang | G06F 1/20 | 361/679.01 |
| 7,359,609 B2 * | 4/2008 | Mahoney | G02B 6/4446 | 385/134 |
| 7,369,400 B2 * | 5/2008 | Bang | H05K 7/20963 | 345/58 |
| 7,663,877 B2 * | 2/2010 | Goto | G06F 1/203 | 361/679.48 |
| 7,719,824 B2 * | 5/2010 | Tanaka | G06F 1/1616 | 361/679.01 |
| 7,798,823 B2 * | 9/2010 | Fujikawa | H05K 1/147 | 439/82 |
| 7,826,223 B2 * | 11/2010 | Iijima | G06F 1/162 | 361/694 |
| 8,002,586 B2 * | 8/2011 | Fleisig | H01R 13/72 | 439/652 |
| 8,064,223 B2 * | 11/2011 | Tachikawa | G06F 1/1616 | 361/730 |
| 8,130,154 B2 * | 3/2012 | Iizuka | H01Q 1/084 | 343/702 |
| 8,154,874 B2 * | 4/2012 | Zhuang | H01L 23/5387 | 361/728 |
| 8,339,805 B2 * | 12/2012 | Fukushima | G03G 15/80 | 361/807 |
| 8,587,961 B2 * | 11/2013 | Matsumura | H02G 3/00 | 361/730 |
| 8,593,820 B2 * | 11/2013 | Suzuki | H05K 1/0281 | 361/749 |
| 8,749,993 B2 * | 6/2014 | Hoshino | H05K 7/1492 | 361/679.01 |
| 8,897,003 B2 * | 11/2014 | Ishii | G06F 1/18 | 174/520 |
| 2001/0019478 A1 * | 9/2001 | Izumi | H01B 13/01227 | 361/826 |
| 2002/0149906 A1 * | 10/2002 | Ichimura | F16M 11/08 | 361/679.06 |
| 2003/0223185 A1 * | 12/2003 | Doczy | G06F 1/1626 | 361/679.11 |
| 2004/0248434 A1 | 12/2004 | Fujimura | | |
| 2006/0221565 A1 * | 10/2006 | Doherty | G06F 1/1632 | 361/679.41 |
| 2007/0202743 A1 * | 8/2007 | Mikami | H01R 4/64 | 439/587 |
| 2008/0024999 A1 * | 1/2008 | Huang | G06F 1/181 | 361/724 |
| 2009/0126976 A1 * | 5/2009 | Iida | H05K 1/028 | 174/254 |
| 2011/0182049 A1 * | 7/2011 | Iwata | G03G 15/80 | 361/826 |
| 2012/0307477 A1 * | 12/2012 | Tachibana | H05K 7/1492 | 361/826 |

* cited by examiner

ELECTRONIC APPARATUS AND METHOD OF MANUFACTURING ELECTRONIC APPARATUS

CROSS-REFERENCE TO RELATED APPLICATION

This application is based upon and claims the benefit of priority of the prior Japanese Patent Application No. 2014-165494, filed on Aug. 15, 2014, the entire contents of which are incorporated herein by reference.

FIELD

The embodiment discussed herein is related to an electronic apparatus and a method of manufacturing an electronic apparatus.

BACKGROUND

Among electronic apparatuses, there is one type of electronic apparatus that includes, for example, a first case and a second case assembled to each other, and a connection cable coupling a first component provided in the first case and a second component provided in the second case. Related documents include Japanese Laid-open Patent Publications No. 8-6672 and No. 2005-5320.

In a method of manufacturing this type of electronic apparatus, in general, the first component provided in the first case and the second component provided in the second case are coupled by the connection cable in a state where the first case and the second case are opened. Thereafter, the first case and the second case are assembled to each other.

In the above-described method of manufacturing the electronic apparatus, the connection cable may be provided with an extra length, in consideration of workability of coupling the connection cable. However, when the connection cable is provided with an extra length, the connection cable may be pinched between the first case and the second case at the time of assembling the first case and the second case.

SUMMARY

According to an aspect of the invention, an electronic apparatus includes: a first case and a second case assembled to each other; a first cable that couples a first component provided in the first case and a second component provided in the second case; and a second cable that couples a pair of members provided in the first case, and provided with a bent section at an intermediate part of the second cable in a longitudinal direction thereof, the second cable supporting the first cable inside the bent section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
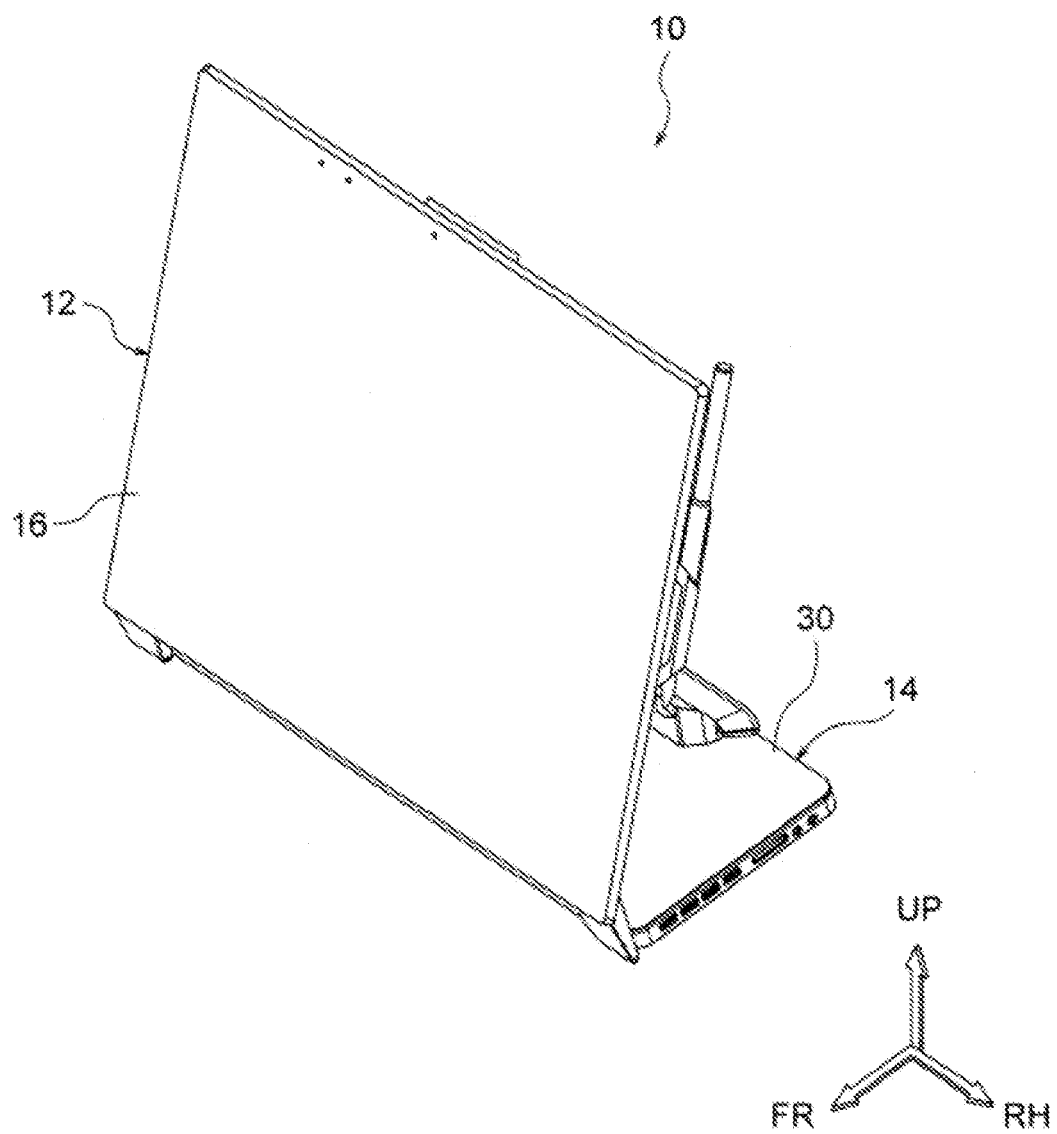
FIG. 1 is a perspective view of an electronic apparatus when viewed from front.
Figure 2:
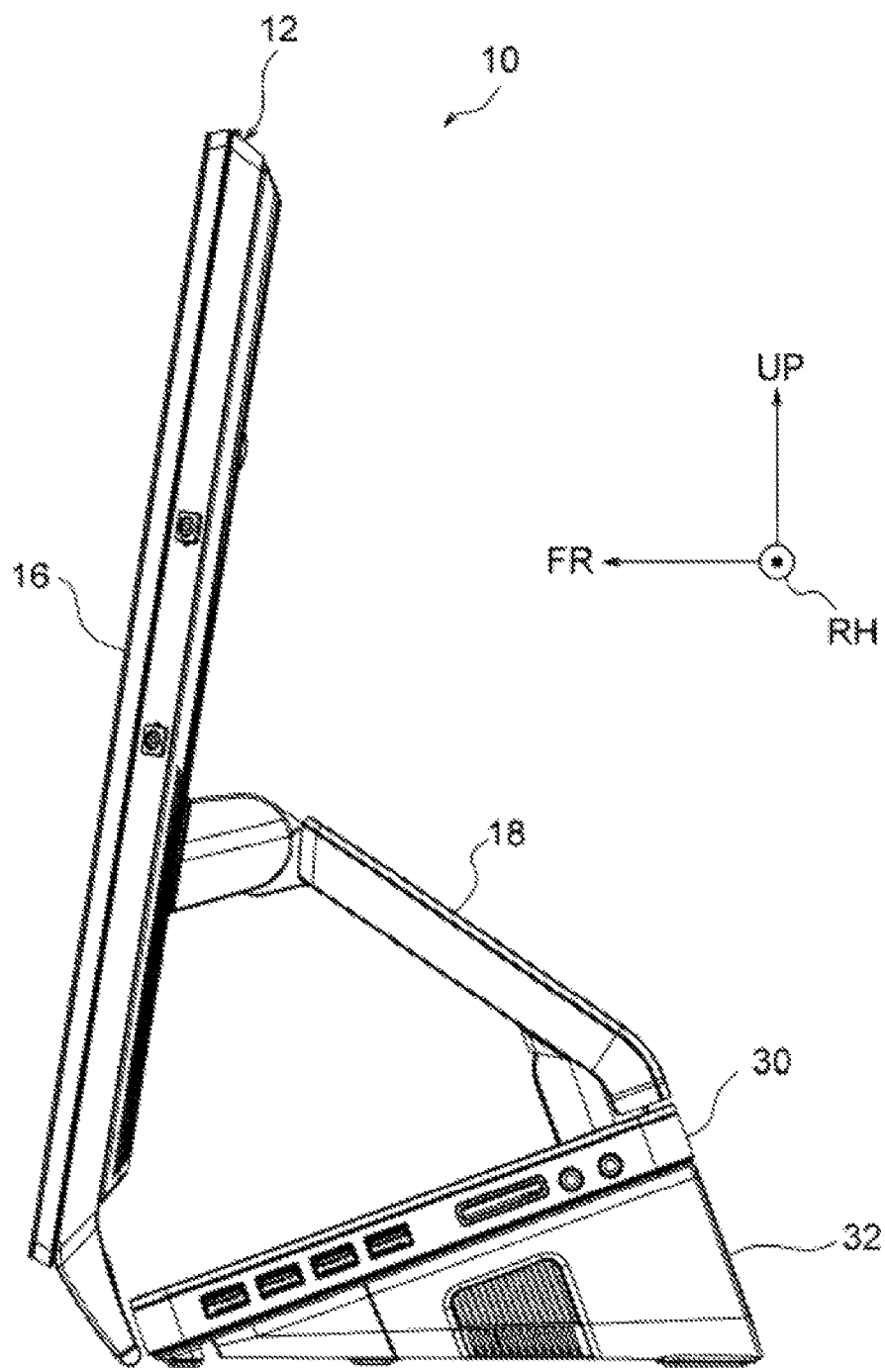
FIG. 2 is a side view of the electronic apparatus.
Figure 3:
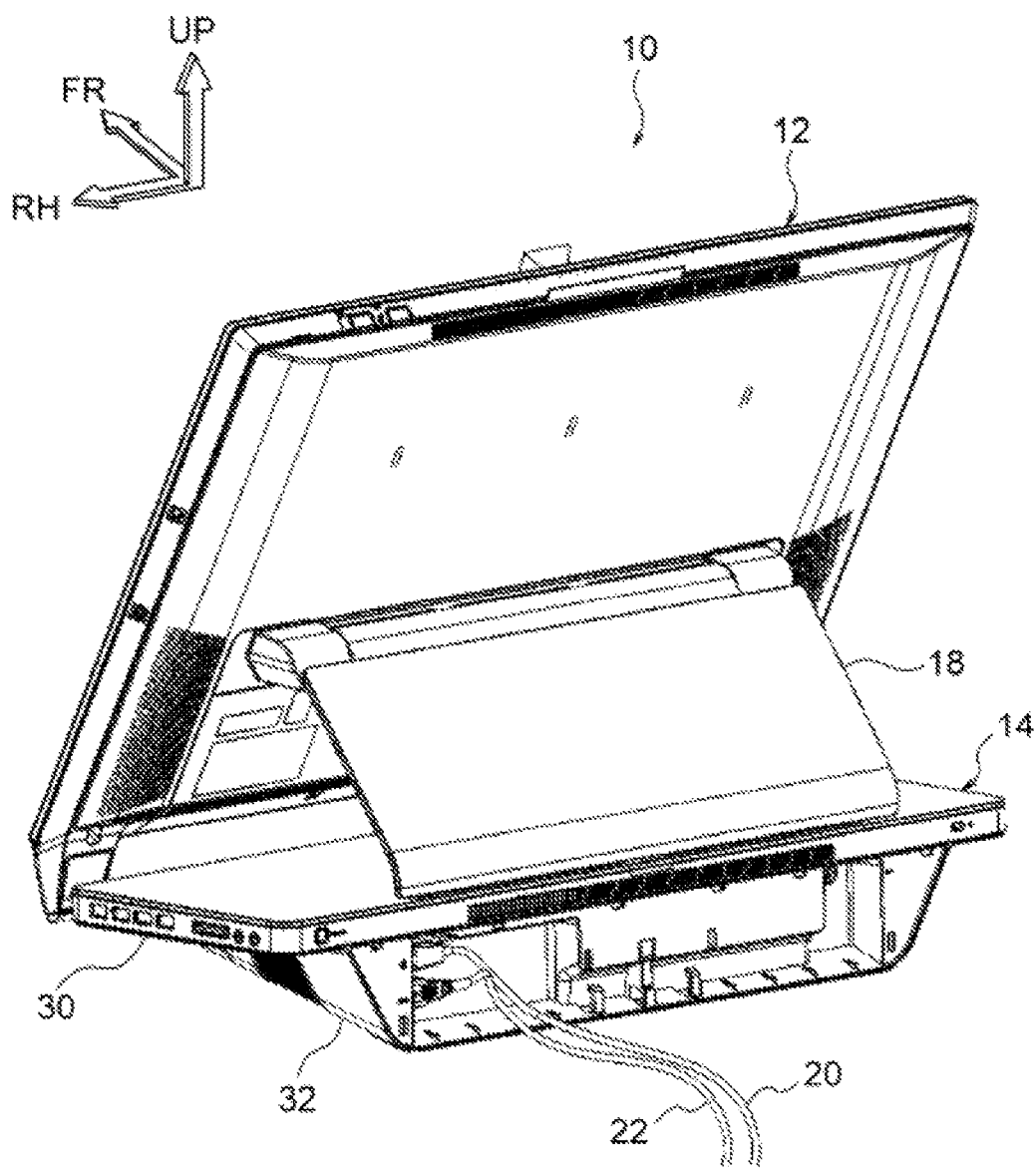
FIG. 3 is a perspective view of the electronic apparatus when viewed from right back.

According to an aspect of a disclosed embodiment, a connection cable may be suppressed from being pinched between a first case and a second case, at the time of assembling the first case and the second case. An embodiment of a technique disclosed in the present application will be described below.

An electronic apparatus 10 according to the present embodiment illustrated in FIGS. 1 to 5 is a display-integrated personal computer. The electronic apparatus 10 includes a display unit 12 and a main unit 14. The display unit 12 is provided with, for example, a display 16 such as a liquid crystal display. The display unit 12 is provided to stand on the main unit 14. A back-face part of the display unit 12 is fixed to an upper-face part of the main unit 14 by a support member 18 (a movable hinge) as illustrated in FIGS. 2 to 5.

Figure 4:
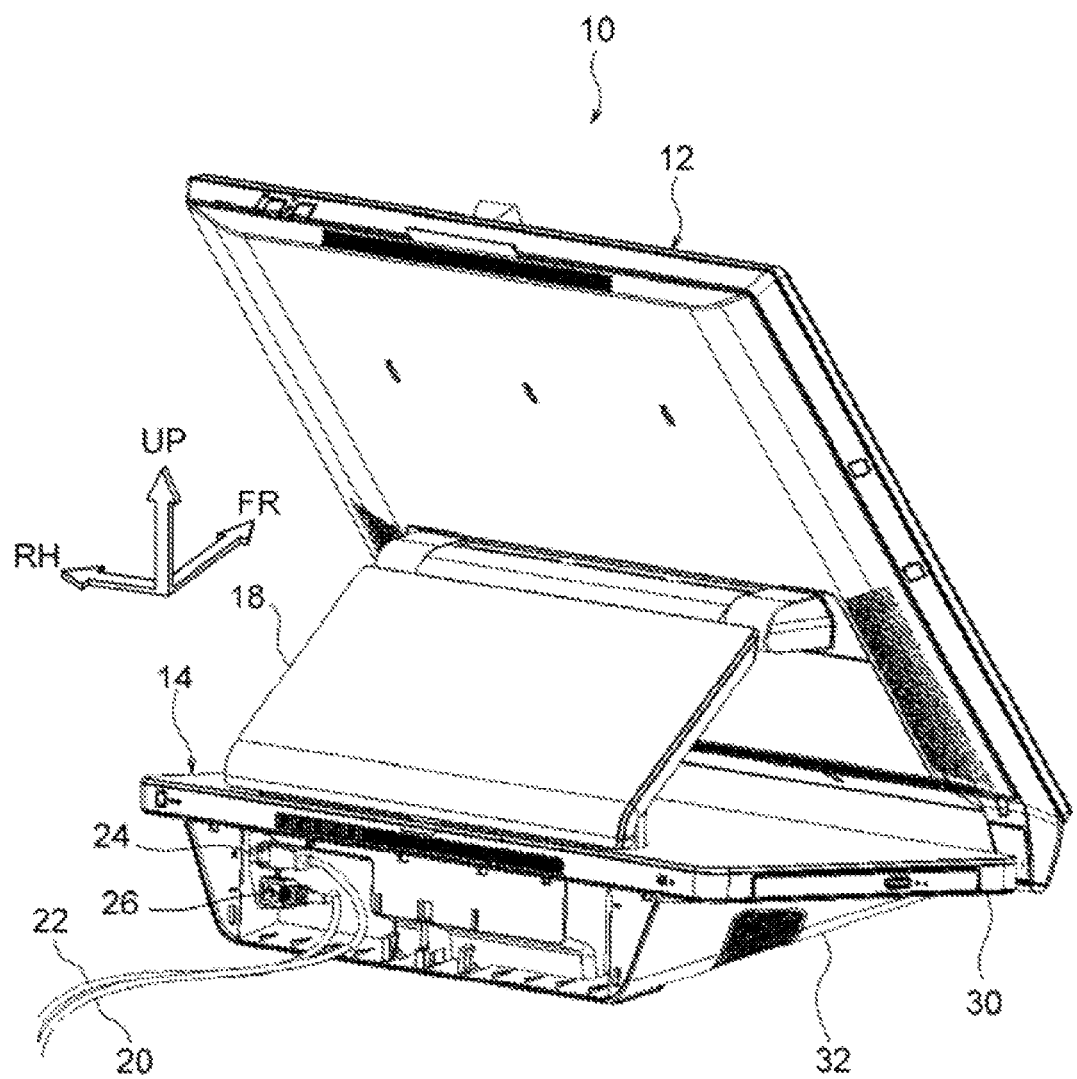
FIG. 4 is a perspective view of the electronic apparatus when viewed from left back.

As illustrated in FIG. 4, a back-face part of the main unit 14 is provided with a pair of external connectors 24 and 26 to which a power cable 20 and a signal cable 22 are to be coupled, respectively. The pair of external connectors 24 and 26 are disposed on one side in a width direction of the back-face part of the main unit 14, and both are disposed to face the other side in the width direction of the main unit 14.

An arrow UP, an arrow FR, and an arrow RH illustrated in FIGS. 1 to 5 indicate an upward side in a height direction, a forward side (frontward side) in a depth direction, and a right side in the width direction, respectively, of the electronic apparatus 10.

Figure 5:
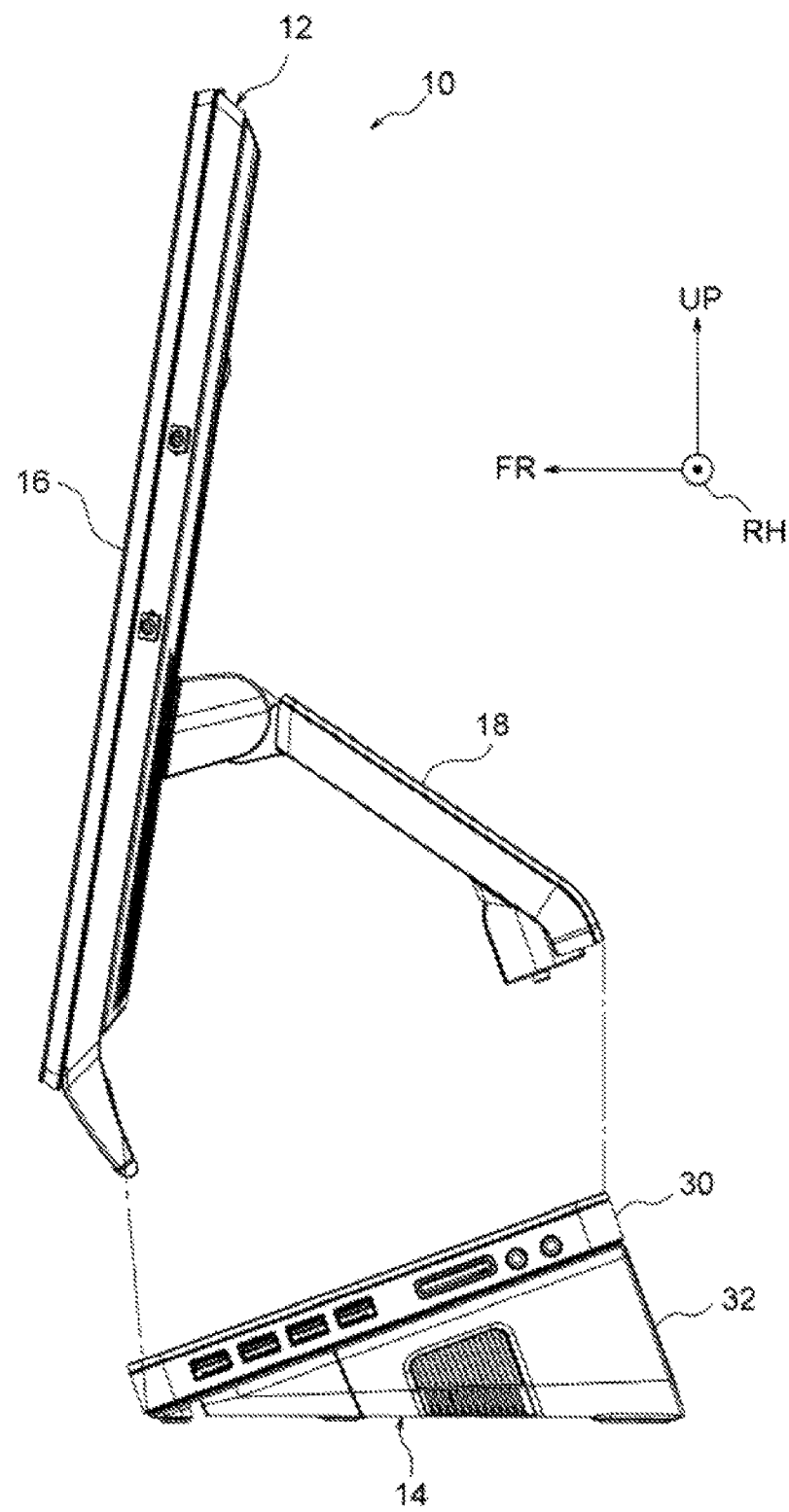
FIG. 5 is an exploded side view of the electronic apparatus.

As illustrated in FIG. 5, the main unit 14 has an upper case 30 that is an example of "a first case", and a lower case 32 that is an example of "a second case". The upper case 30 and the lower case 32 are separated from each other in a height direction of the main unit 14, and assembled to each other.

Figure 6:
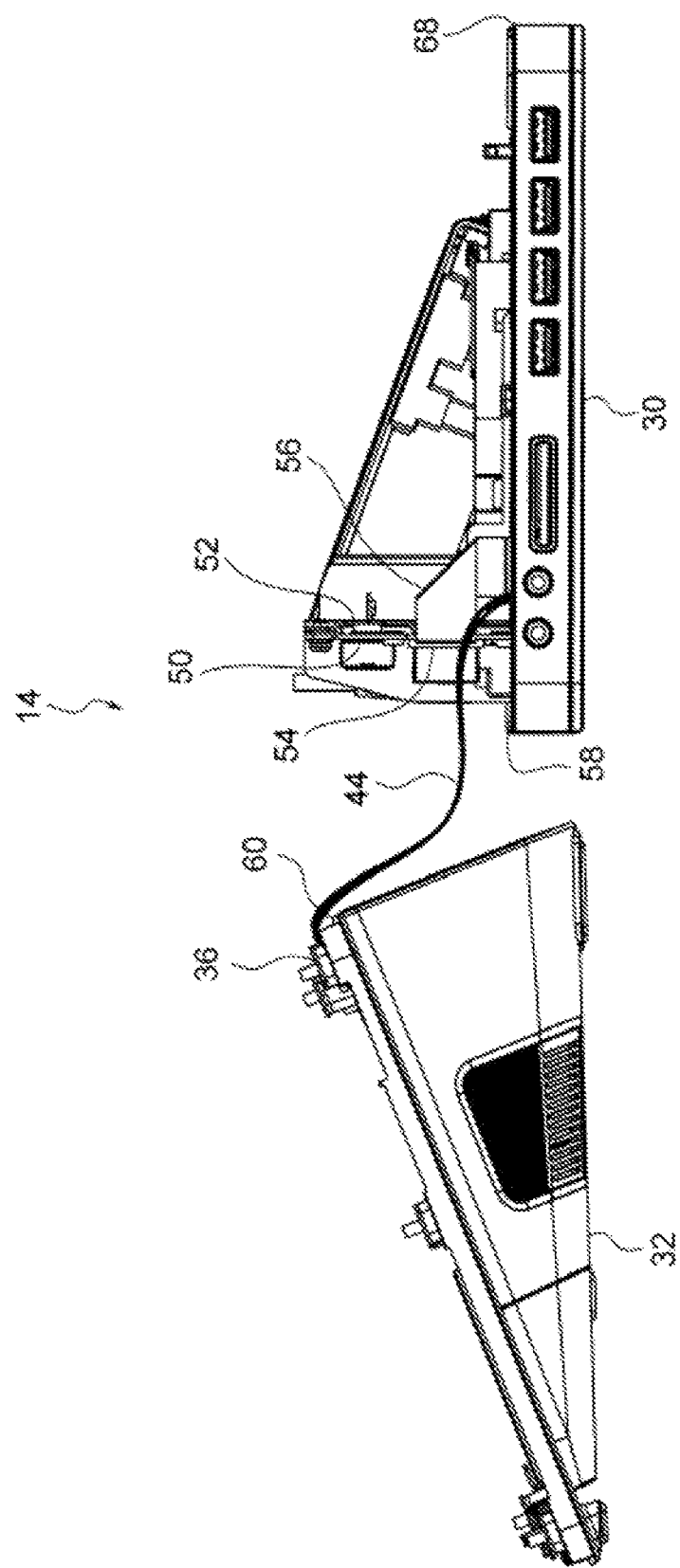
FIG. 6 is a side view illustrating a state where an upper case and a lower case are opened.
Figure 7:
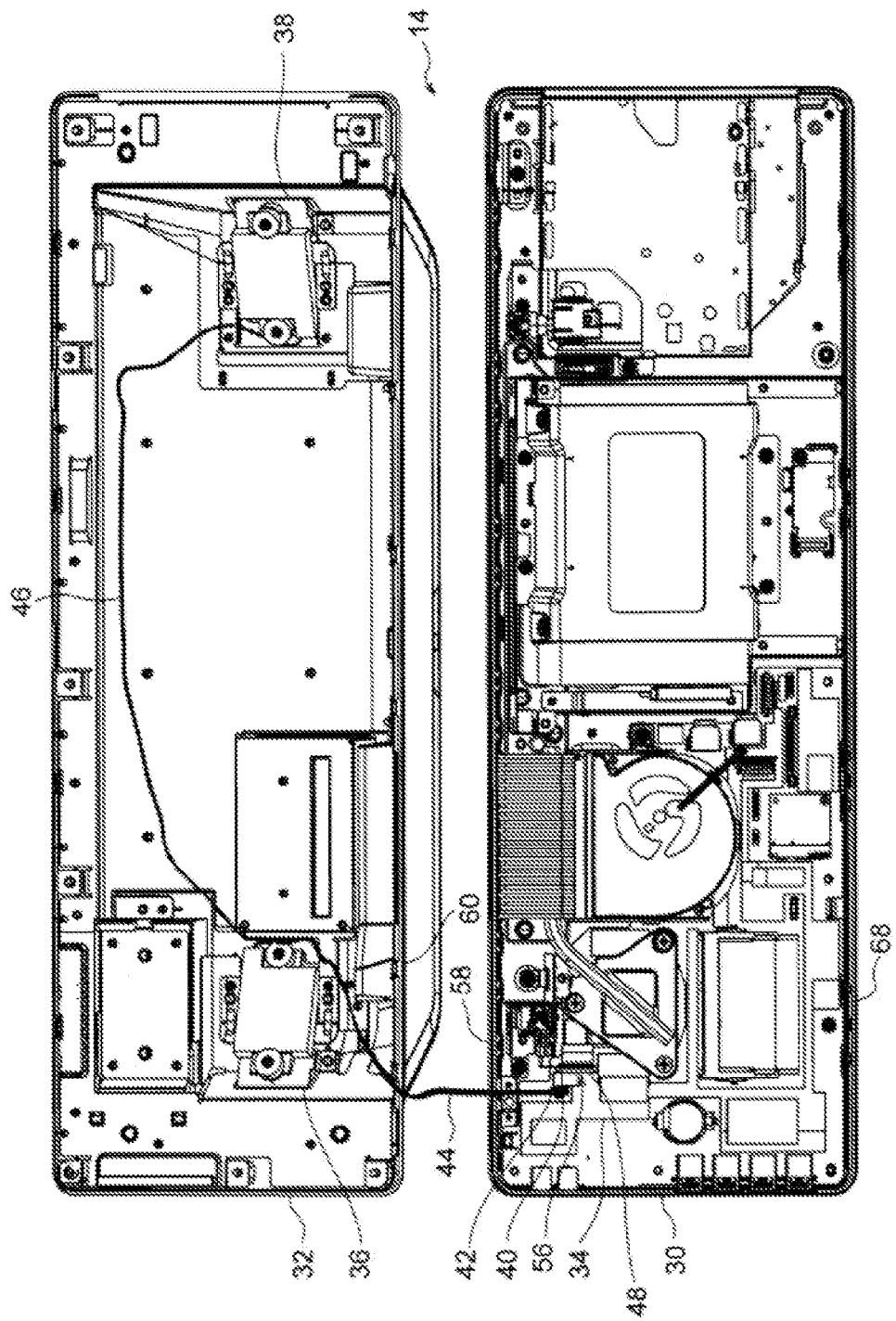
FIG. 7 is a plan view illustrating the state where the upper case and the lower case are opened.

FIGS. 6 and 7 illustrate a state where the upper case 30 and the lower case 32 are opened using the respective back-face sides as a fulcrum. As illustrated in FIG. 7, a main board 34 and other components are provided inside the upper case 30. Further, a pair of speakers 36 and 38 as well as other components are provided inside the lower case 32.

Figure 15:
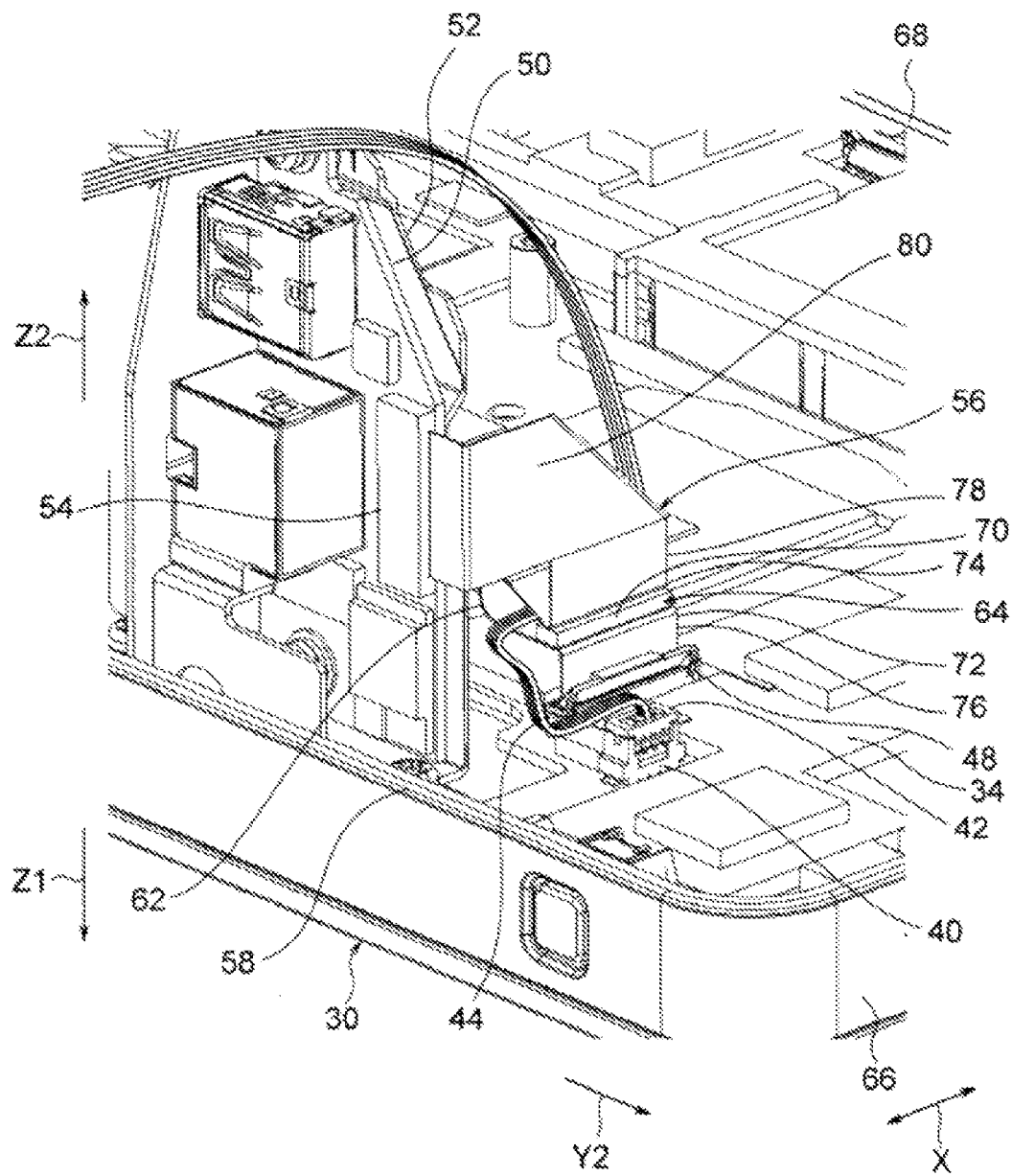
FIG. 15 is a perspective view illustrating a state where the connection cable is held inside the bent section.

The main board 34 is disposed to face an inner surface (back face of a ceiling) of the upper case 30. As illustrated in FIG. 15, a connector 40 that is an example of "a first component" is mounted on the main board 34, and one end of a connection cable 44 is coupled to a connector 42 coupled to the connector 40.

The other end of the connection cable 44 is coupled to the speaker 36, which is an example of "a second component", of the pair of speakers 36 and 38 illustrated in FIG. 7. The speaker 36 and the speaker 38 are coupled by a cable 46. The connection cable 44 is provided with an extra length to facilitate connection of the connector 42 to the connector 40, in the state where the upper case 30 and the lower case 32 are opened using the respective back-face sides as the fulcrum.

Figure 11:
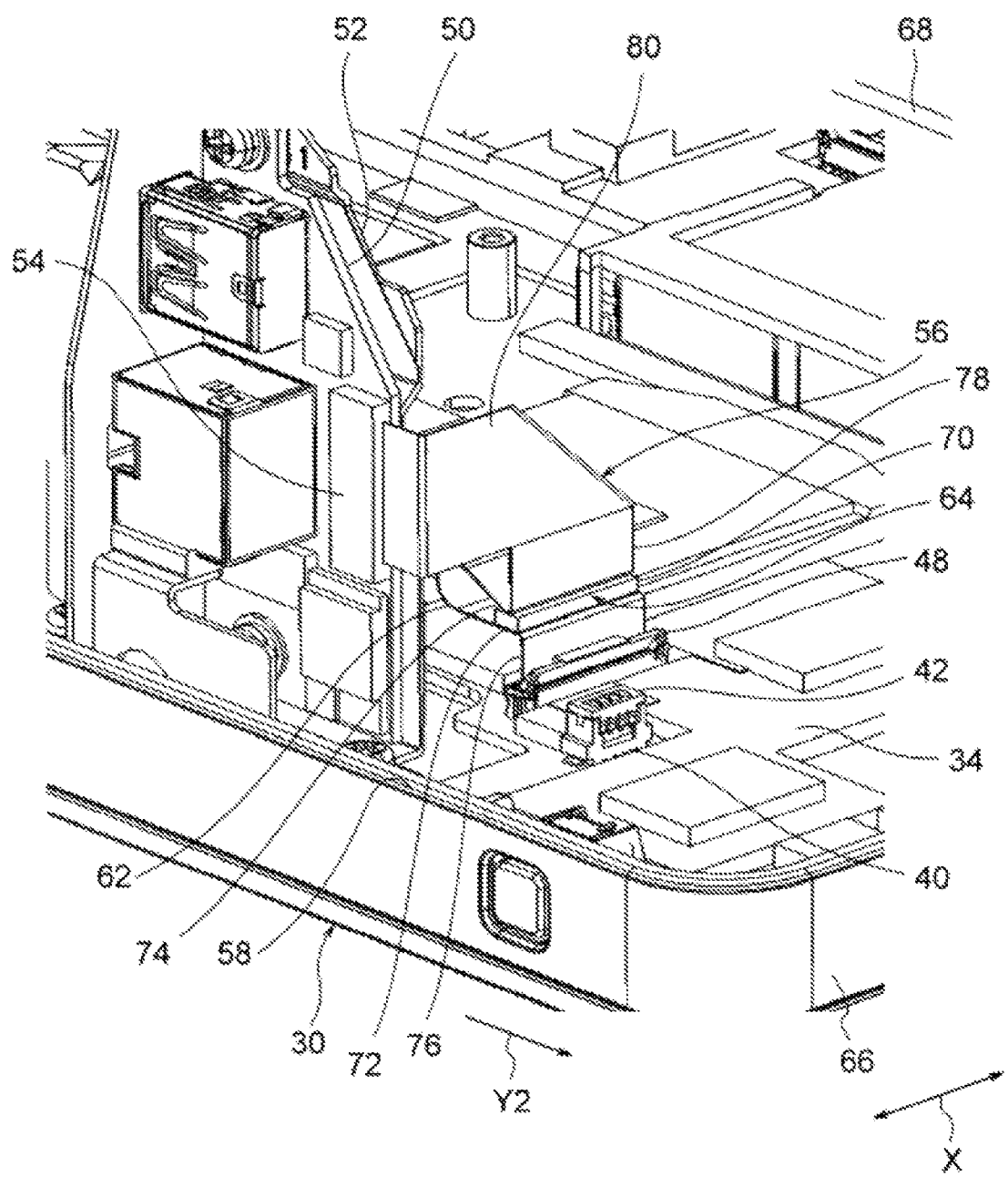
FIG. 11 is a perspective view illustrating a flexible cable and a peripheral structure thereof.

Further, as illustrated in FIG. 11, on the main board 34, a connector 48 is mounted next to the above-described connector 40. Further, a sub-board 50 is provided next to the connectors 40 and 48, in the inside of the upper case 30. The sub-board 50 is supported by a bracket 52 provided inside the upper case 30. The sub-board 50 is disposed to be upright relative to the main board 34.

A connector 54 is mounted on the sub-board 50. The connector 54 of the sub-board 50 and the connector 48 of the main board 34 are disposed away from each other in an upright direction of the sub-board 50 relative to the main board 34 (a normal direction of the main board 34). A pair of the connectors 48 and 54 is an example of "a pair of members". The connectors 48 and 54 in this pair are coupled by a flexible cable 56 that is an example of "a wiring cable" (also see FIG. 12).

Figure 12:
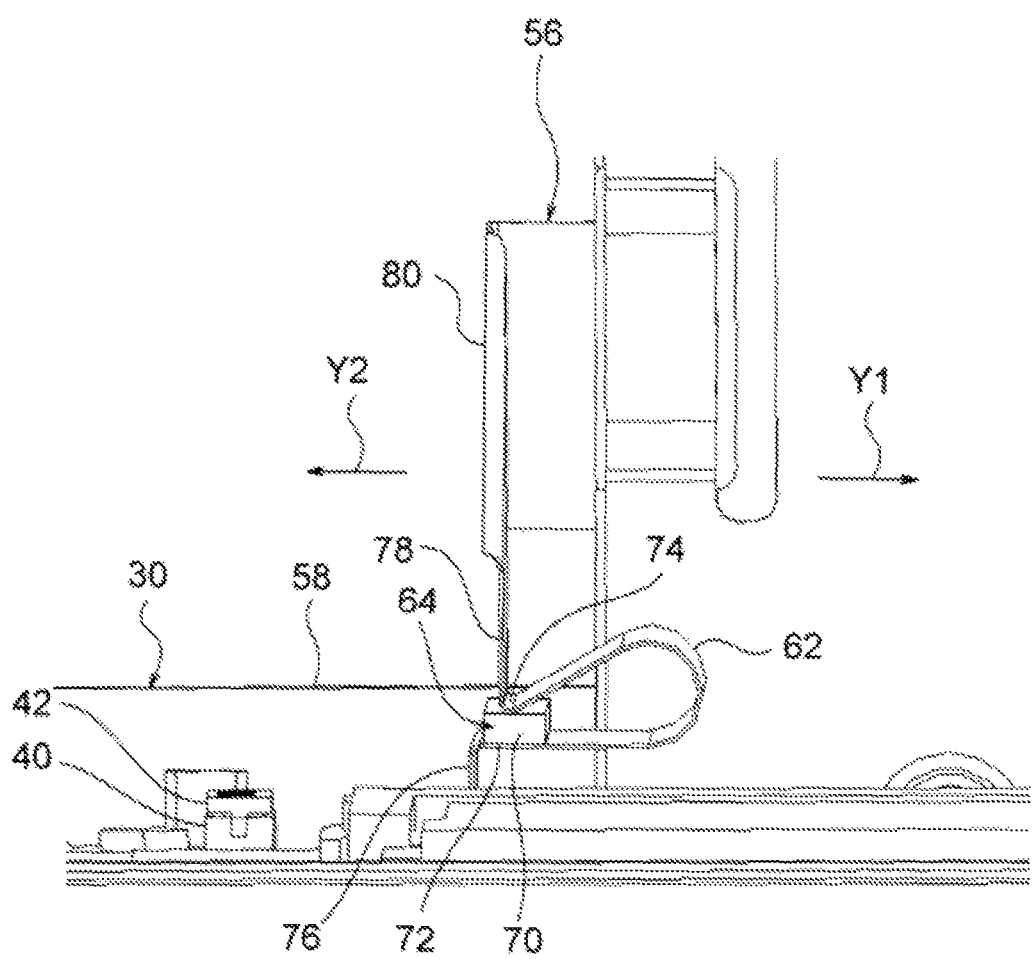
FIG. 12 is a side view illustrating the flexible cable and the peripheral structure thereof.

In FIGS. 11 and 12, the above-described connection cable 44 (see FIGS. 6 and 7) is not illustrated for convenience.

Figure 8:
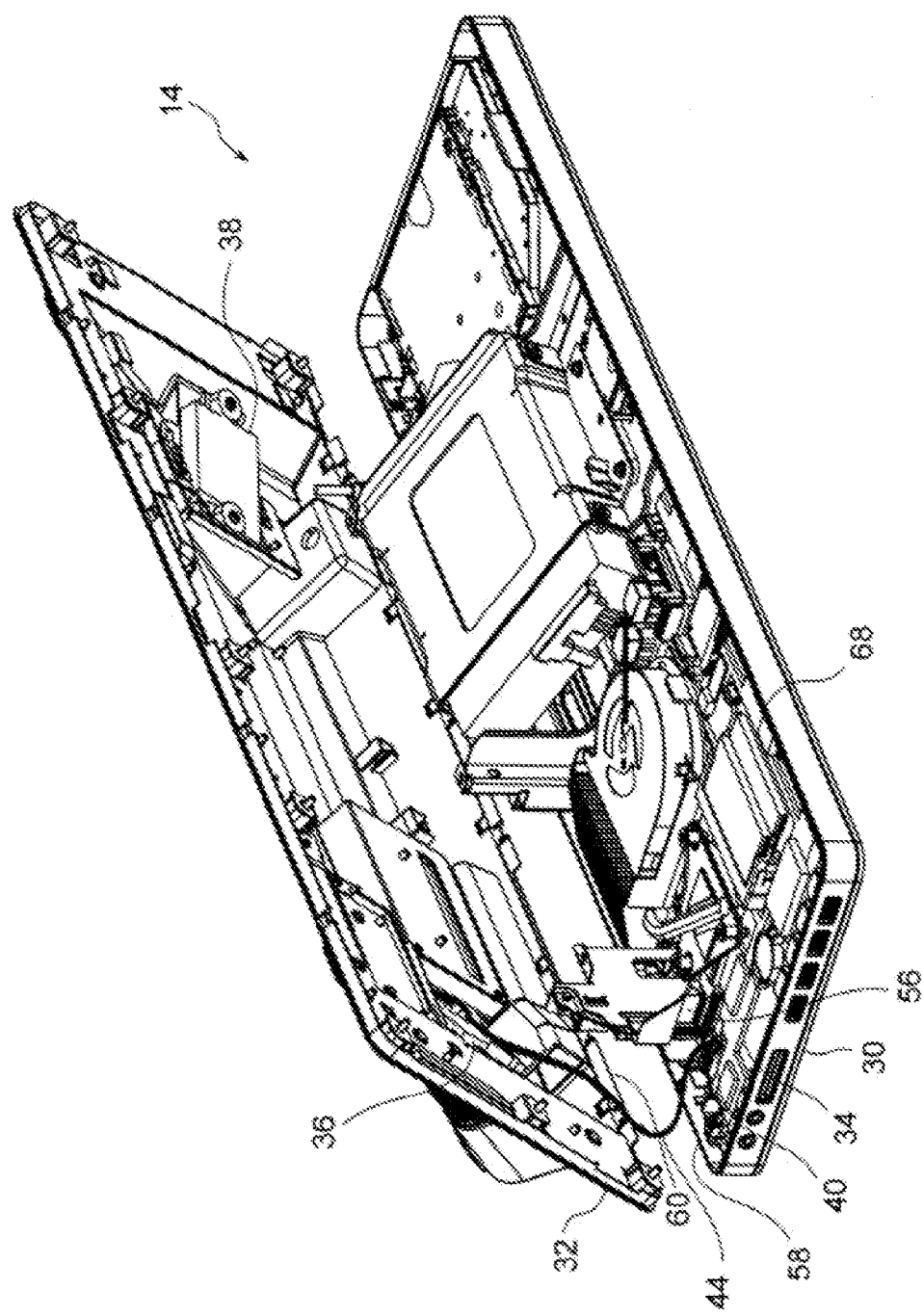
FIG. 8 is a perspective view illustrating a process of closing the upper case and the lower case.
Figure 9:
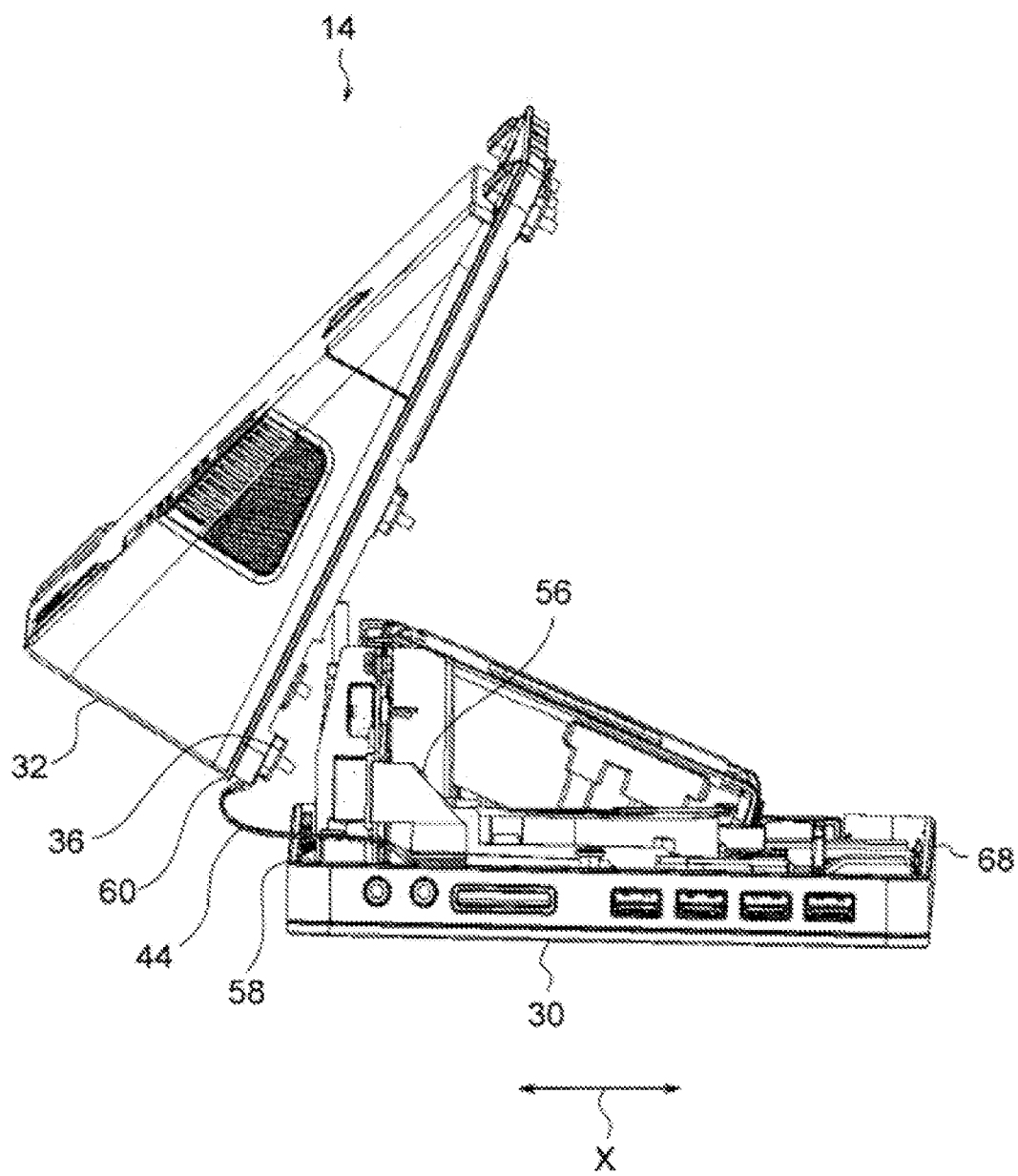
FIG. 9 is a side view illustrating the process of closing the upper case and the lower case.
Figure 10:
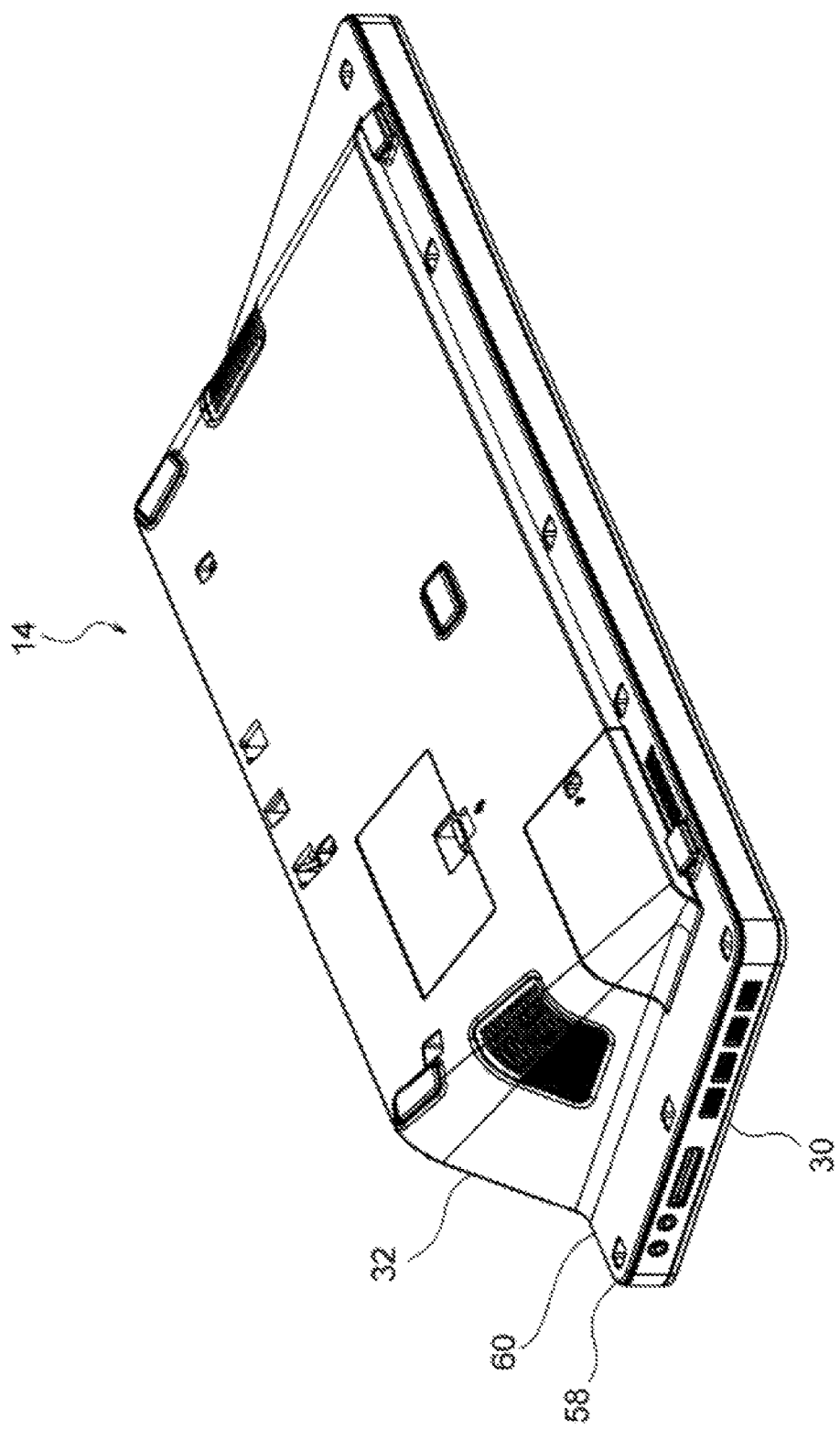
FIG. 10 is a perspective view illustrating a state where the upper case and the lower case are closed.

Meanwhile, when the connection cable 44 directly runs from the connector 40 of the upper case 30 to the speaker 36 of the lower case 32 without being clamped at some midpoint as illustrated in FIGS. 6 and 7, the following inconvenience may arise. The connection cable 44 is provided with an extra length. For this reason, the connection cable 44 may be pinched between the upper case 30 and the lower case 32 (in particular, between edge portions 58 and 60 on the back-face sides), at the time of assembling the upper case 30 and the lower case 32, as illustrated in FIGS. 8 to 10.

Therefore, in the present embodiment, the following structure is adopted to suppress the connection cable 44 from being pinched between the upper case 30 and the lower case 32.

Figure 13:
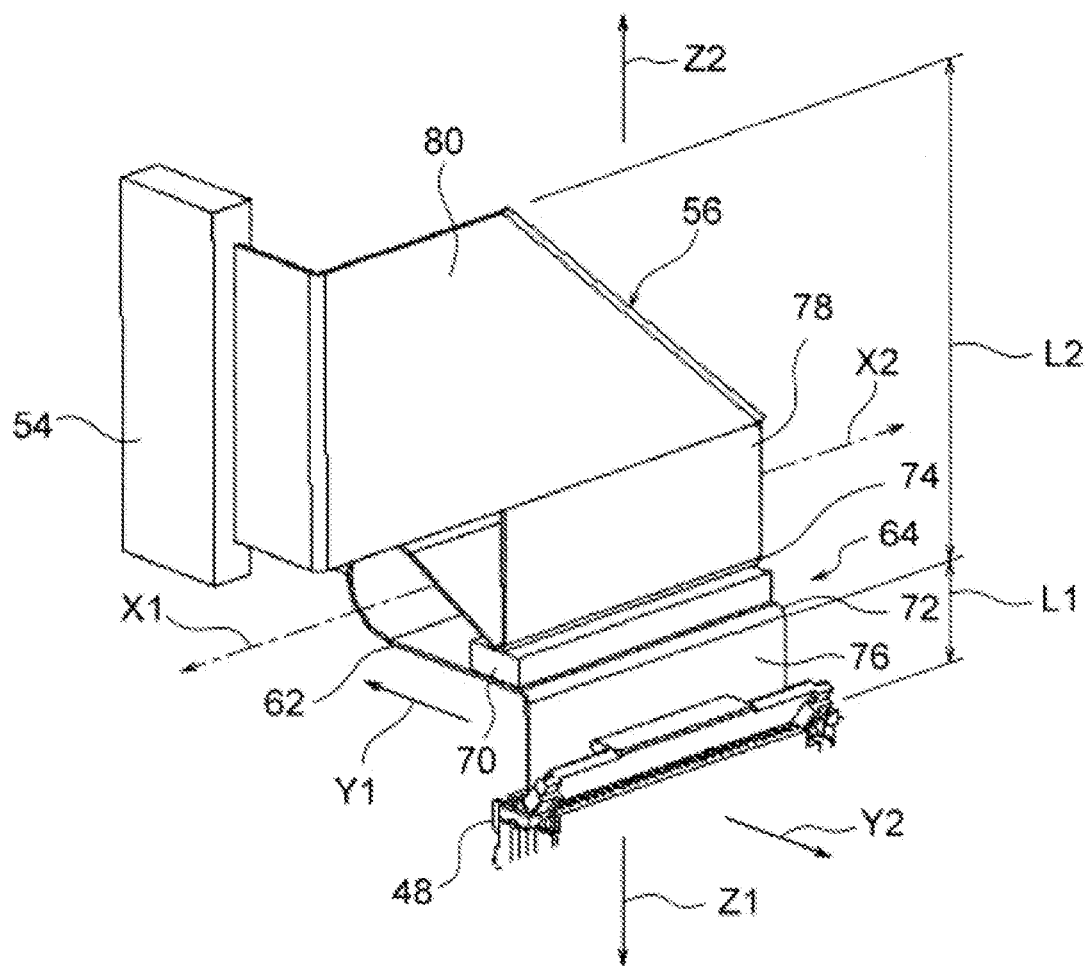
FIG. 13 is an enlarged perspective view of the flexible cable having a bent section.

As illustrated in FIGS. 11 to 13, a bent section 62, which is bent to be U-shaped, is formed at an intermediate point in a longitudinal direction of the flexible cable 56. The connection cable 44 (an extra-length part) is held inside the bent section 62, as illustrated in FIGS. 15 to 18.

To be more specific, the bent section 62 is bent using a width direction of the flexible cable 56 (a direction indicated by arrows X1 and X2) as an axis, as illustrated in FIG. 13. The bent section 62 has an opening portion 64 facing a side face 66 (see FIG. 11) of the upper case 30.

In the present embodiment, a separation direction of the upper case 30 and the lower case 32 illustrated in FIG. 5 is a direction indicated by arrows Z1 and Z2 illustrated FIG. 13, and a direction in which the opening portion 64 of the bent section 62 faces is a direction indicated by an arrow Y2. The direction indicated by the arrows Z1 and Z2 is an example of "a separation direction of the first case and the second case", and the direction indicated by the arrow Y2 is an example of "a direction intersecting the separation direction of the first case and the second case".

As illustrated in FIG. 11, the bent section 62 is formed with a width direction aligned with a front-back direction of the upper case 30. The front-back direction of the upper case 30 (a direction indicated by an arrow X), which is the width direction of the bent section 62, is a direction in which, of peripheral edges of the upper case 30, an edge portion 58 on the back-face side and an edge portion 68 on a front-face side opposite to the edge portion 58 on the back-face side are arranged side by side (see also FIG. 9). The edge portion 58 on the back-face side is an example of "one edge portion", and the edge portion 68 on the front-face side is an example of "the other edge portion".

As illustrated in FIG. 13, the opening portion 64 of the bent section 62 is provided with a block-shaped sponge member 70 which is an example of "a blocking member". The opening portion 64 is blocked with the sponge member 70. For instance, the sponge member 70 is attached and fixed to one end portion 72 of a pair of end portions 72 and 74 of the bent section 62 on the opening portion 64 side by, for example, a double-faced tape or the like.

Further, the sponge member 70 is pressed at both sides thereof by the pair of end portions 72 and 74 of the bent section 62 on the opening portion 64 side. Pressing the sponge member 70 at both sides thereof by using the pair of end portions 72 and 74 is achievable by adjusting a length of each of a pair of led-out sections 76 and 78 to be described later, according to a distance between the pair of connectors 48 and 54, or by adjusting a thickness of the sponge member 70.

The flexible cable 56 has the pair of led-out sections 76 and 78, which are continuous to the pair of end portions 72 and 74 of the bent section 62 on the opening portion 64 side, respectively. The one led-out section 76 is led out from the one end portion 72 of the pair of end portions 72 and 74, in a direction opposite to the other end portion 74 (that is, in the direction indicated by the arrow Z1). The other led-out section 78 is led out from the other end portion 74 of the pair of end portions 72 and 74, in a direction opposite to the one end portion 72 (that is, in the direction indicated by the arrow Z2). The bent section 62 is formed at an intermediate point in a clearance direction between the pair of connectors 48 and 54 (the direction indicated by the arrows Z1 and Z2), by forming the pair of led-out sections 76 and 78 on both sides of the bent section 62.

A leading end of the one led-out section 76 is coupled to the connector 48. The one led-out section 76 has a length shorter than a length of the other led-out section 78. In other words, L1<L2 is held where the length of the one led-out section 76 is L1 and the length of the other led-out section 78 is L2.

A folded-back section 80 is formed to continue from a leading end of the other led-out section 78. The folded-back section 80 is folded back at the leading end of the other led-out section 78. A folding direction of the folded-back section 80 is opposite to a direction in which the bent section 62 protrudes relative to the other led-out section 78. In other words, the side toward which the bent section 62 protrudes is a side indicated by an arrow Y1, relative to the other led-out section 78, whereas the side where the folded-back section 80 is folded back at the leading end of the other led-out section 78 is a side indicated by the arrow Y2 (that is, the side where the folded-back section 80 is located relative to the other led-out section 78), which is opposite to the arrow Y1 (see also FIG. 12).

In addition, the folded-back section 80 is folded toward a side of the other led-out section 78 (in the direction indicated by the arrow X1). Therefore, the folded-back section 80 is twisted relative to the other led-out section 78.

Figure 14:
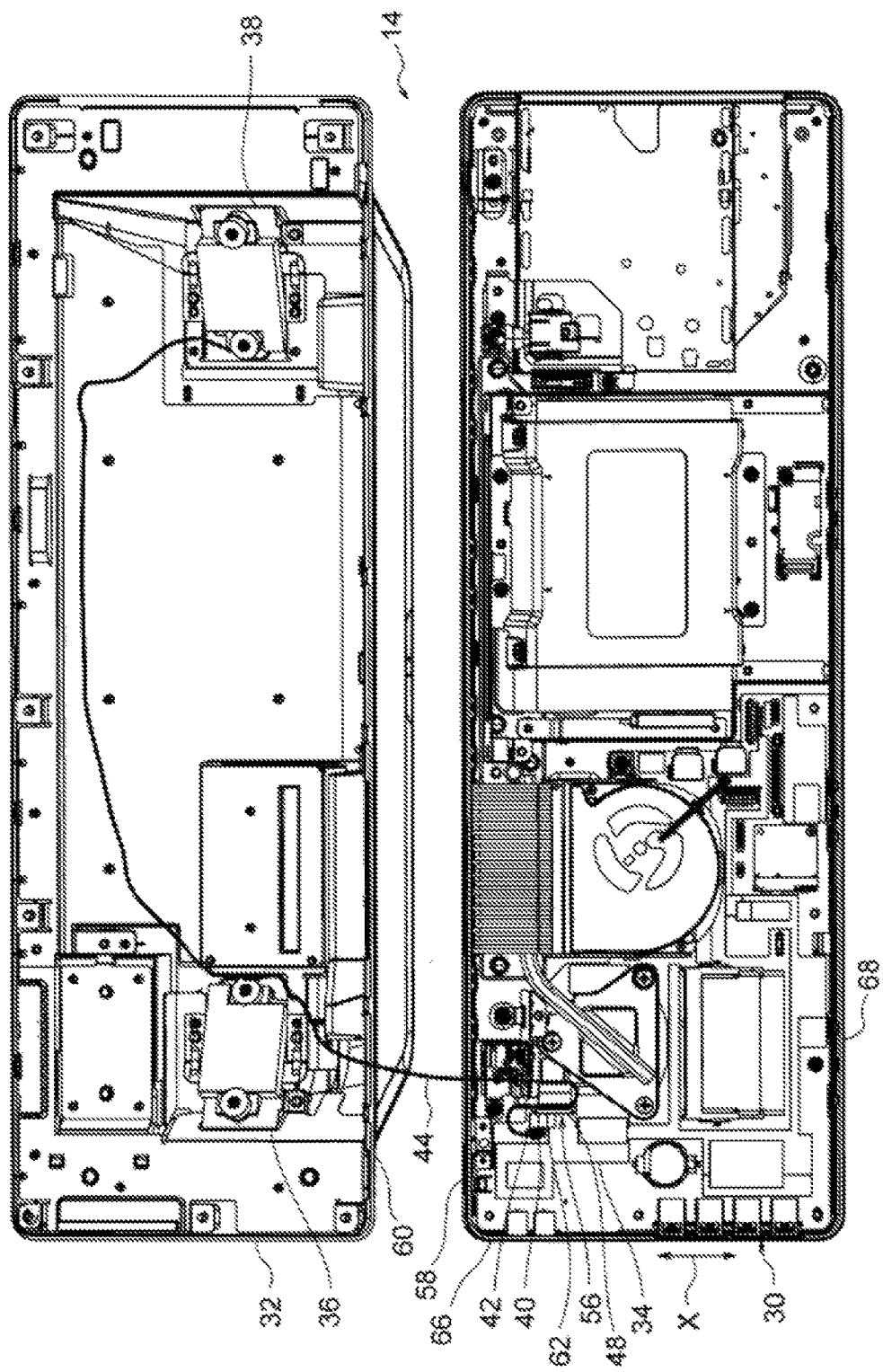
FIG. 14 is a plan view illustrating a state where the upper case and the lower case are opened and a connection cable is held inside the bent section.

As illustrated in FIG. 15, the connector 40 and the connector 48 mounted on the main board 34, as well as the flexible cable 56 including the bent section 62 are disposed on an edge portion 58 side (the back-face side) of the peripheral part of the upper case 30. Further, as illustrated in FIG. 14, the pair of speakers 36 and 38 are also unevenly disposed on an edge portion 60 side (the back-face side) of the lower case 32 with respect to a central part in the front-back direction of the lower case 32. The edge portions 58 and 60 on the back-face sides of the upper case 30 and the lower case 32 are each an example of "one edge portion".

Figure 16:
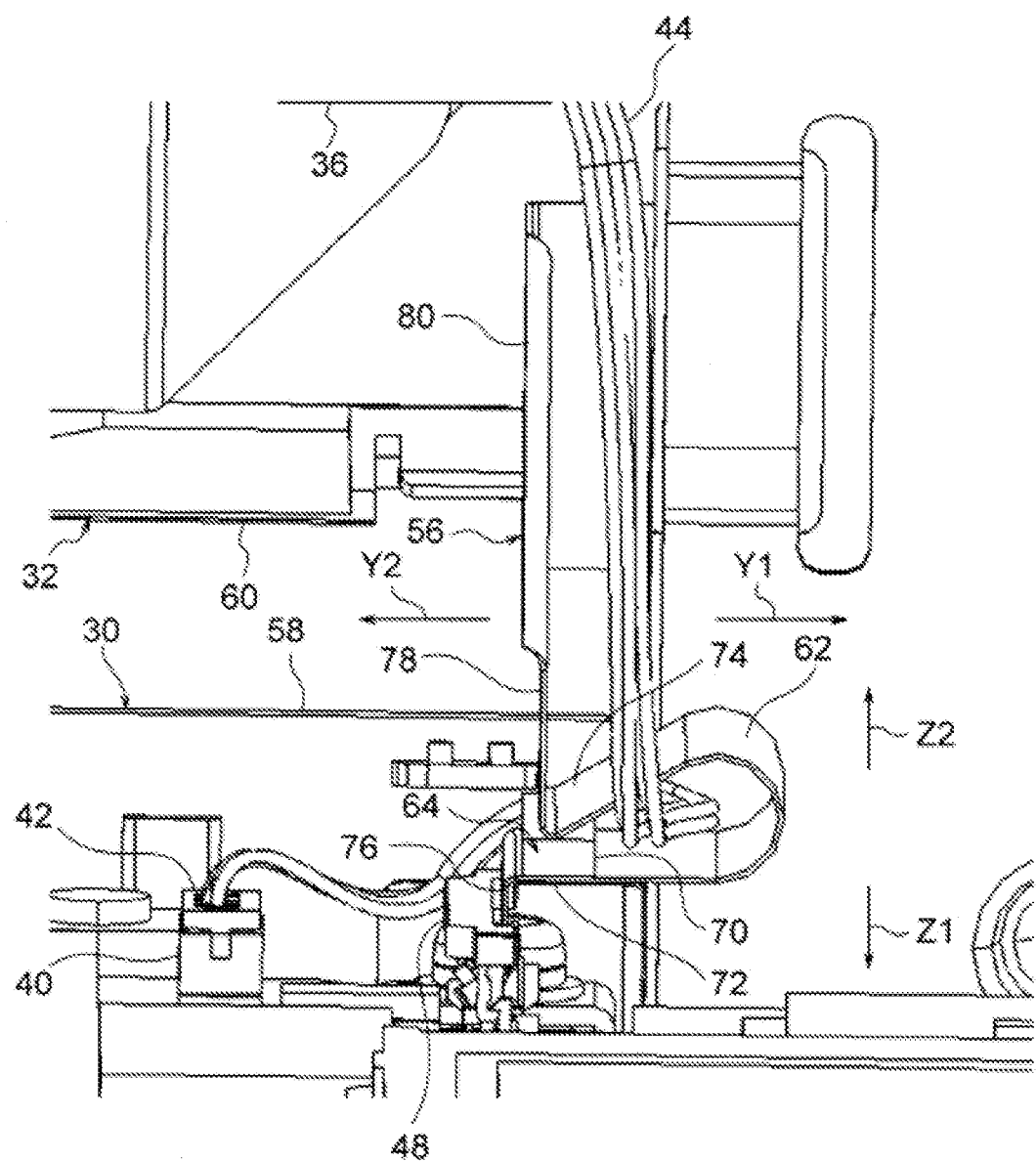
FIG. 16 is a side view illustrating the state where the connection cable is held inside the bent section.
Figure 17:
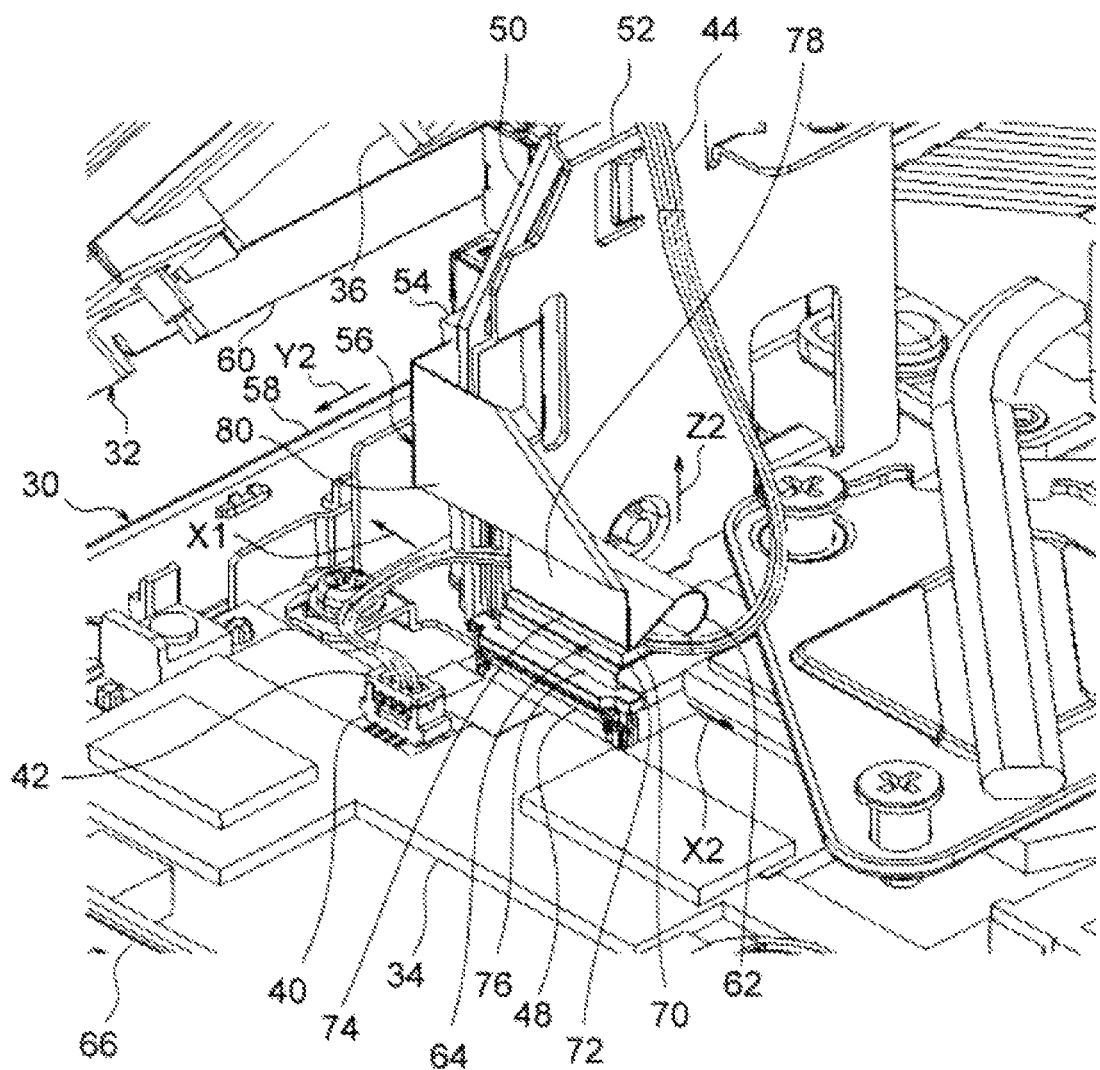
FIG. 17 is a perspective view illustrating the state where the connection cable is held inside the bent section.
Figure 18:
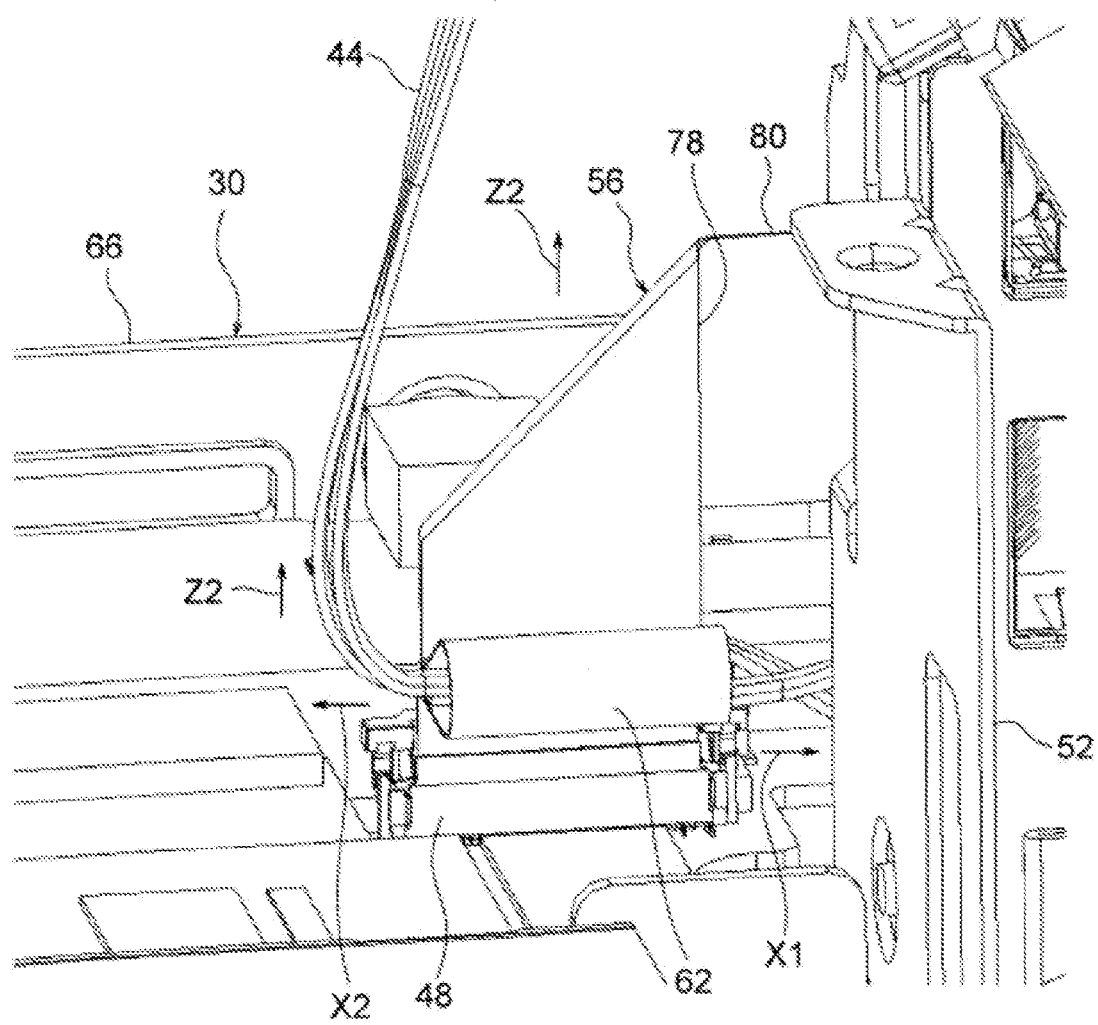
FIG. 18 is a perspective view illustrating the state where the connection cable is held inside the bent section.

As illustrated in FIG. 15, the connection cable 44 passes through the inside of the bent section 62, from the one edge portion 58 side (the back-face side) toward the other edge portion 68 side (the front-face side), after being led out from the connector 40. Further, as illustrated in FIGS. 16 and 17, the connection cable 44 is wired to run toward the speaker 36 provided in the lower case 32, after passing through the inside of the bent section 62. Furthermore, to be more specific, the connection cable 44 is led out from the inside of the bent section 62 toward the side opposite to the upper case 30 (in the direction indicated by the arrow Z2) (see also FIG. 18).

Next, a method of manufacturing (a method of assembling) the electronic apparatus 10 according to the present embodiment will be described.

First, as illustrated in FIGS. 6 and 7, the main board 34, the sub-board 50, the bracket 52, and other components are attached to the inside of the upper case 30. In addition, the pair of speakers 36 and 38 as well as other components are attached to the inside of the lower case 32.

Next, as illustrated in FIGS. 11 and 12, the connector 48 mounted on the main board 34 and the connector 54 mounted on the sub-board 50 are coupled by the flexible cable 56. In this process, the flexible cable 56 is formed to have the bent section 62, the pair of led-out sections 76 and 78, as well as the folded-back section 80 that are described above. The flexible cable 56 may be formed before being coupled to the connector 48 and the connector 54, or may be formed after being coupled to the connector 48 and the connector 54.

Further, the block-shaped sponge member 70 is provided in the opening portion 64 of the bent section 62 formed at the flexible cable 56. The sponge member 70 is attached and fixed to the one end portion 72 of the pair of end portions 72 and 74 by, for example, a double-faced tape or the like. The opening portion 64 is thus blocked with the sponge member 70. In this process, more preferably, the sponge member 70 is in a state of being pressed at both sides thereof by the pair of end portions 72 and 74 of the bent section 62 on the opening portion 64 side.

Next, as illustrated in FIG. 7, the upper case 30 and the lower case 32 are disposed in the state of being opened using the respective back-face sides as the respective supporting points (that is, a state where the inside of the upper case 30 and the inside of the lower case 32 face in the same direction (upward), and the edge portions 58 and 60 on the respective back-face sides are arranged side by side). Further, the connector 42 coupled to one end of the connection cable 44 is coupled to the connector 40 (see FIG. 15) mounted on the main board 34, and the other end of the connection cable 44 is coupled to the speaker 36.

The connector 40 and the connector 48 mounted on the main board 34, as well as the flexible cable 56 including the bent section 62 are disposed on the edge portion 58 side (the back-face side) of the peripheral edges of the upper case 30. Further, the pair of speakers 36 and 38 are also unevenly disposed on the edge portion 60 side (the back-face side) of the lower case 32 with respect to the central part of the lower case 32 in the front-back direction. Therefore, in the state where the upper case 30 and the lower case 32 are opened using the respective back-face sides as the respective supporting points, the connection cable 44 is wired to straddle the edge portions 58 and 60 provided on the respective back-face sides of the upper case 30 and the lower case 32.

Furthermore, the connection cable 44 is provided beforehand with the extra length, so that the connector 42 coupled to the one end of the connection cable 44 may be coupled to the connector 40 mounted on the main board 34, in the state where the upper case 30 and the lower case 32 are opened using the respective back-face sides as the respective supporting points.

Next, as illustrated in FIGS. 15 to 18, the extra-length part of the connection cable 44 is inserted into the bent section 62 through the opening portion 64 of the bent section 62, and the connection cable 44 is held inside the bent section 62. The block-shaped sponge member 70 blocks the opening portion 64 of the bent section 62. Therefore, the sponge member 70 inhibits the connection cable 44 from coming out from the inside of the bent section 62.

Further, as illustrated in FIG. 15, the connection cable 44 is wired to pass through the inside of the bent section 62 from the one edge portion 58 side (the back-face side) toward the other edge portion 68 side (the front-face side) opposite thereto, after being led out from the connector 40. In addition, as illustrated in FIGS. 16 and 17, the connection cable 44 is wired to run toward the speaker 36 of the lower case 32, after passing through the inside of the bent section 62. To be more specific, the connection cable 44 is wired to be led out from the inside of the bent section 62 to the side opposite to the upper case 30 (in the direction indicated by the arrow Z2) (see also FIG. 18).

Figure 19:
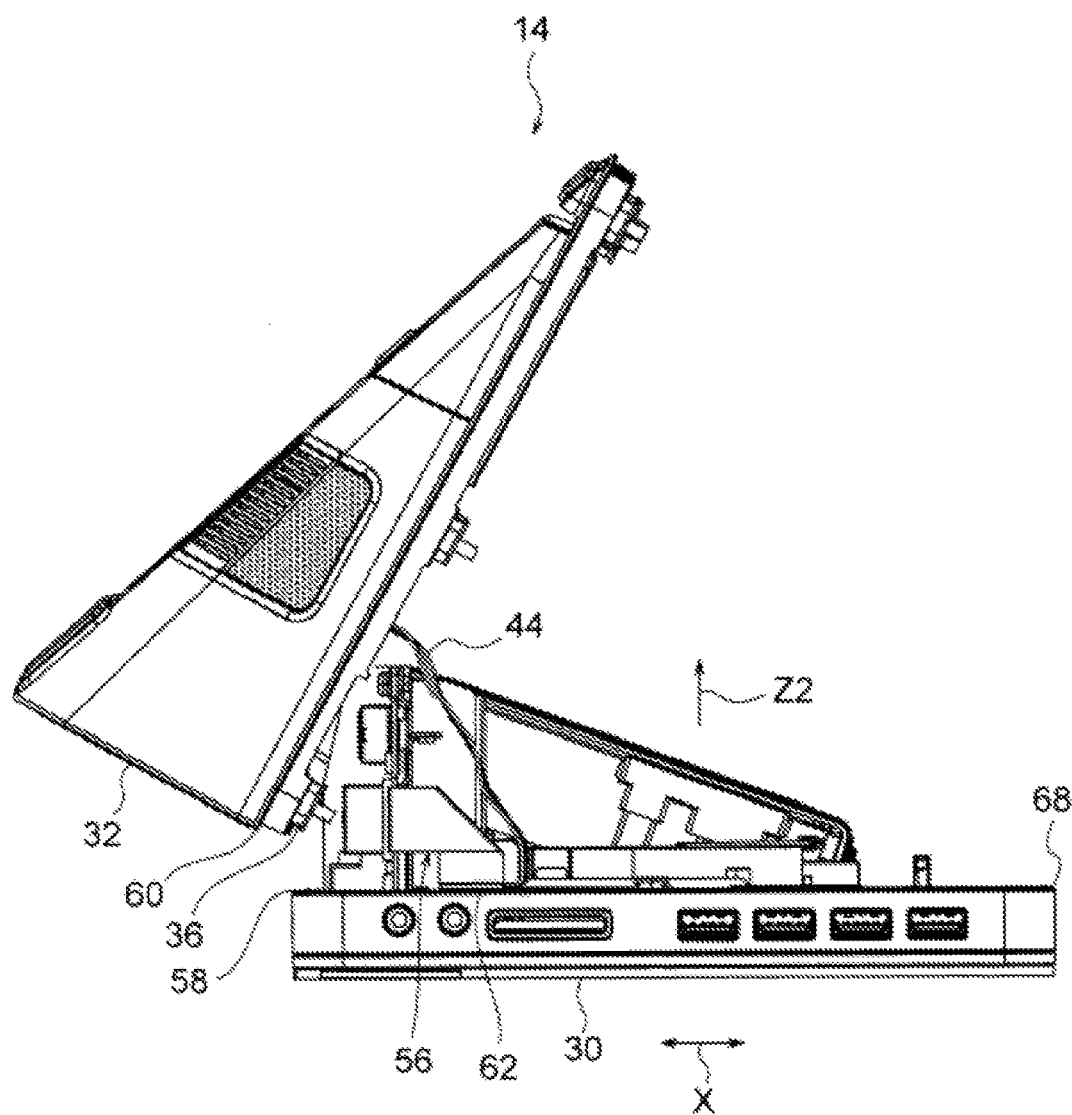
FIG. 19 is a side view illustrating a process of closing the upper case and the lower case in the state where the connection cable is held inside the bent section.

Next, in the state where the connection cable 44 is held inside the bent section 62 as described above (see also FIG. 14), the lower case 32 is turned about the back-face side, relative to the upper case 30, as illustrated in FIG. 19. The lower case 32 is then closed on the upper case 30 (see FIG. 10). In this state of the lower case 32 being closed on the upper case 30, the lower case 32 and the upper case 30 are engaged with each other by using the respective nails, or screwed to each other. The upper case 30 and the lower case 32 are thus assembled to each other, thereby completing the main unit 14.

Further, the display unit 12 separately assembled is assembled to the main unit 14 as illustrated in FIG. 5, and the electronic apparatus 10 illustrated in FIGS. 1 to 4 is completed. The above-described method of manufacturing the electronic apparatus 10 is an example, and the above-described sequence of assembly operations may be appropriately altered.

Next, operation and effects of the present embodiment will be described.

As described above in detail, according to the present embodiment, the connection cable 44 is held inside the bent section 62, which is formed at the flexible cable 56 and bent to be U-shaped. In this state, the upper case 30 and the lower case 32 are assembled to each other. Therefore, even when the connection cable 44 is provided with the extra length, the connection cable 44 may be inhibited from sticking out between the upper case 30 and the lower case 32, at the time of assembling the upper case 30 and the lower case 32, as illustrated in FIGS. 16 to 19. Therefore, the connection cable 44 may be suppressed from being pinched between the upper case 30 and the lower case 32.

Besides, the bent section 62 formed at the flexible cable 56 is used as a clamp to hold the connection cable 44, and therefore, providing a clamping member separately from the bent section 62 may be unnecessary. In addition, since the clamping member is unnecessary, an installation space and an installation process for the clamping member are also unnecessary. This allows cost reduction.

Moreover, the bent section 62 provided to hold the connection cable 44 is formed at a part of the flexible cable 56, and the bent section 62 has flexibility. Therefore, the U-shaped bent section 62 may be easily deformed in an opening direction, thereby allowing the extra-length part of the connection cable 44 to be inserted easily into the bent section 62 through the opening portion 64 of the bent section 62. This may improve workability of allowing the connection cable 44 to be held in the inside of the bent section 62.

In addition, the bent section 62 is bent to be U-shaped, by using the width direction of the flexible cable 56 (a flat cable) as the axis. Therefore, for instance, a holding length provided to hold the connection cable 44 may be long, as compared with, for example, a case where the bent section 62 is formed to an ordinary wire having a circular cross section. This allows more stable holding (or supporting) of the connection cable 44, and therefore, the connection cable 44 may be more effectively inhibited from being pinched between the upper case 30 and the lower case 32.

In addition, the connector 48 mounted on the main board 34 and the connector 54 mounted on the sub-board 50 are disposed to be away from each other. The bent section 62 is formed at the intermediate point in the clearance direction between the pair of connectors 48 and 54. Therefore, if a spring property of the bent section 62 comes into play, workability at the time of coupling the flexible cable 56 and the connector 48 may be improved, and removal of the flexible cable 56 and the connector 48 may be suppressed.

In addition, a structure of allowing the bent section 62 to hold (or support) the connection cable 44 may be said to be equivalent to providing a function of clamping the connection cable 44, to the extra-length part of the flexible cable 56 formed at the intermediate part in the clearance distance between the pair of connectors 48 and 54. Therefore, adding a new shape to the flexible cable 56 may be suppressed, thereby allowing suppression of cost increase.

Moreover, the opening portion 64 of the bent section 62 is blocked with the block-shaped sponge member 70, and thus, coming out of the connection cable 44 from the inside of the bent section 62 may be inhibited by the sponge member 70. This may also more effectively suppress the connection cable 44 from being pinched between the upper case 30 and the lower case 32.

In particular, the sponge member 70 is in the state of being pressed at both sides, by the pair of end portions 72 and 74 of the bent section 62 on the opening portion 64 side. Therefore, formation of a gap may be suppressed from occurring between the sponge member 70 and the end portion 74, which is not affixed to the sponge member 70, of the pair of end portions 72 and 74. This may more effectively inhibit the connection cable 44 from coming out from the inside of the bent section 62.

In addition, from the one end portion 72 of the pair of end portions 72 and 74 of the bent section 62 on the opening portion 64 side, the one led-out section 76 is led out toward the side opposite to the other end portion 74. The leading end of the one led-out section 76 is coupled to the connector 48 of the main board 34. That is, the bent section 62 is fixed to the main board 34 via the one led-out section 76 (that is, the flexible cable 56 is coupled to the connector 48, at a position below and near the bent section 62), and therefore, deformation and displacement of the bent section 62 may be suppressed.

Besides, the length of the one led-out section 76 is shorter than the length of the other led-out section 78, and therefore, deformation and displacement of the bent section 62 may be more effectively suppressed.

Further, the folded-back section 80 is formed at the leading end of the other led-out section 78. The folded-back section 80 is folded back to the side opposite to the side toward which the bent section 62 protrudes (the side indicated by the arrow Y2), relative to the other led-out section 78 (see FIG. 12). That is, the folded-back section 80 is folded back in a direction in which the opening portion 64 of the bent section 62 closes, and therefore, the U-shaped bent section 62 may be suppressed from deforming in an opening direction. This may more effectively inhibit the connection cable 44 from coming out from the inside of the bent section 62.

Furthermore, the folded-back section 80 is twisted relative to the other led-out section 78, by being folded back toward the side of the other led-out section 78 (in the direction indicated by the arrow X1 in FIG. 13). This twisting of the folded-back section 80 relative to the other led-out section 78 may increase rigidity of the other led-out section 78. This may also suppress deformation and displacement of the bent section 62.

In addition, as illustrated in FIG. 7, the connector 40 and the connector 48 mounted on the main board 34, as well as the flexible cable 56 including the bent section 62 are disposed on the edge portion 58 side (the back-face side) of the peripheral edges of the upper case 30. Moreover, the pair of speakers 36 and 38 are also unevenly disposed on the edge portion 60 side (the back-face side) of the lower case 32 with respect to the central part of the lower case 32 in the front-back direction. Therefore, in the state where the upper case 30 and the lower case 32 are opened using the respective back-face sides as the respective supporting points, the connection cable 44 is wired to straddle the edge portions 58 and 60 provided on the respective back-face sides of the upper case 30 and the lower case 32.

However, as illustrated in FIG. 15, the bent section 62 is formed with its width direction aligned with a depth direction of the upper case 30 (the direction indicated by the arrow X, in which the edge portion 58 on the back-face side and the edge portion 68 on the front-face side are arranged side by side). Further, the connection cable 44 is wired to run toward the speaker 36 provided in the lower case 32 illustrated in FIGS. 16 and 17, after being led out from the connector 40, and then passing through the inside of the bent section 62 from the one edge portion 58 side (the back-face side) toward the other edge portion 68 side (the front-face side) opposite thereto.

Since the connection cable 44 thus passes through the inside of the bent section 62 from the one edge portion 58 side toward the other edge portion 68 side, the connection cable 44 is kept away from the edge portion 58 on the back-face side (a pinching side). This may suppress the connection cable 44 from being pinched between the edge portions 58 and 60 on the respective back-face sides of the upper case 30 and the lower case 32, when the lower case 32 is closed on the upper case 30, by being turned about the back-face side, relative to the upper case 30.

In addition, the opening portion 64 of the bent section 62 faces in the direction toward the side face 66 of the upper case 30 (in the direction indicated by the arrow Y2), which is an example of the direction intersecting the separation direction of the upper case 30 and the lower case 32. Therefore, even if the connection cable 44 moves in the separation direction of the upper case 30 and the lower case 32 (the direction indicated by the arrows Z1 and Z2) at the time of assembling the upper case 30 and the lower case 32, it may be possible to inhibit the connection cable 44 from coming out from the inside of the bent section 62.

Further, the connection cable 44 is led out from the inside of the bent section 62 to the side opposite to the upper case 30 (in the direction indicated by the arrow Z2). Therefore, the connection cable 44 led out from the inside of the bent section 62 runs toward the speaker 36 without making a detour, thereby allowing suppression of an increase in the length of the connection cable 44. This allows cost reduction.

Next, modifications of the present embodiment will be described.

In the present embodiment, the main unit 14 has the upper case 30 and the lower case 32 that are separated from each other in the height direction of the main unit 14. However, the main unit 14 may have a first case and a second case that are separated from each other in a direction other than the height direction of the main unit 14.

Further, the connection cable 44 couples the connector 40 provided in the upper case 30 and the speaker 36 provided in the lower case 32, but may couple a first component provided in the upper case 30 and a second component provided in the lower case 32.

Furthermore, the bent section 62 may be formed at a wiring cable having a shape other than the shape of the flexible cable 56, although it is more preferable to form the bent section 62 at the flexible cable 56 (a flat cable).

The sponge member 70 provided to block the opening portion 64 of the bent section 62 is attached and fixed to the one end portion 72 of the pair of end portions 72 and 74 by, for example, a double-faced tape or the like. However, the sponge member 70 may be attached and fixed to the other end portion 74 of the pair of end portions 72 and 74.

When the sponge member 70 is thus attached and fixed to the other end portion 74, a side where the connection cable 44 is led out from the inside of the bent section 62 (the arrow Z1 side) and a side where the sponge member 70 is attached to the pair of end portions 72 and 74 (the arrow Z1 side) are the same. Therefore, the sponge member 70 may more effectively inhibit removal of the connection cable 44 from the inside of the bent section 62.

Further, the sponge member 70 may be attached and fixed to both of the end portions 72 and 74 by, for example, a double-faced tape or the like. In this case, the connection cable 44 may be held inside the bent section 62, by being inserted from one side-face opening of the U-shaped bent section 62 to the other side-face opening. Furthermore, the connection cable 44 may be held inside the bent section 62, before the sponge member 70 is fixed to the opening portion 64 of the bent section 62, and the sponge member 70 may be then fixed to the opening portion 64 of the bent section 62.

The sponge member 70 is used as an example of "the blocking member" for the opening portion 64 of the bent section 62, but a member other than the sponge member 70 may be used.

Figure 20:
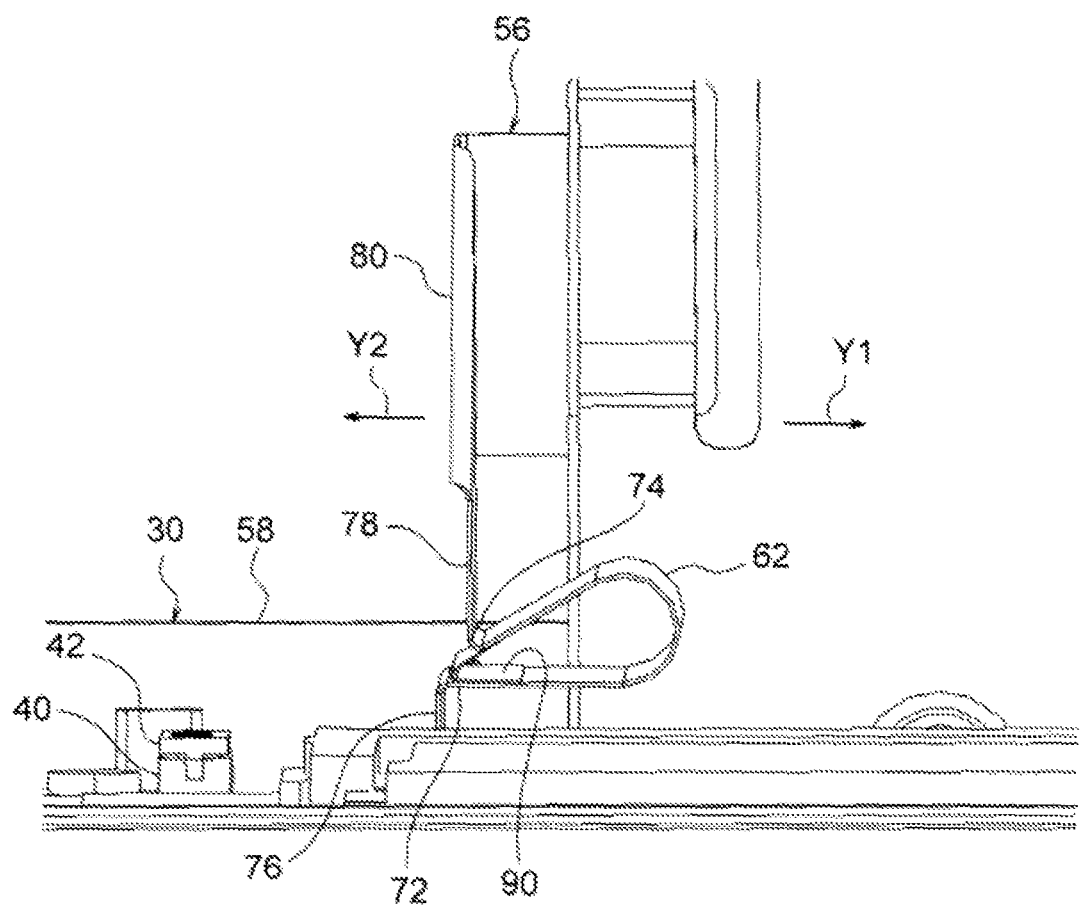
FIG. 20 is a side view illustrating a state where an opening portion of the bent section is blocked with a sheet member according to a modification example.
Figure 21:
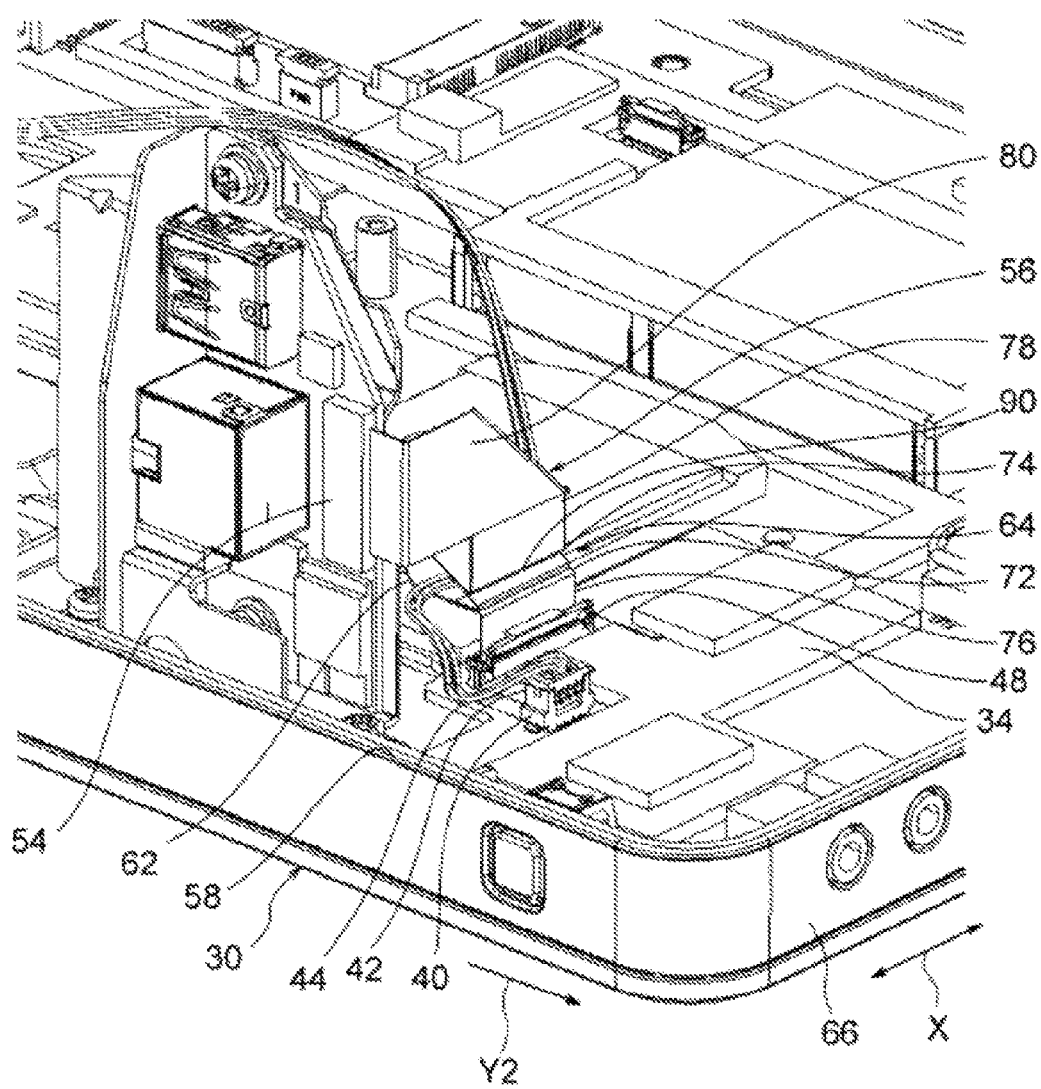
FIG. 21 is a perspective view illustrating the state where the opening portion of the bent section is blocked with the sheet member according to the modification example.

For example, in a modification illustrated in FIGS. 20 and 21, a sheet member 90 is used as an example of "the blocking member". The sheet member 90 couples the pair of end portions 72 and 74 of the bent section 62 on the opening portion 64 side. The sheet member 90 is bent to be substantially V-shaped. In this state of being bent to be substantially V-shaped, the sheet member 90 couples the pair of end portions 72 and 74 of the bent section 62 on the opening portion 64 side.

The sheet member 90 is attached and fixed to at least one of the end portions 72 and 74 by, for example, a double-faced tape or the like. When the sheet member 90 is fixed to either one of the end portions 72 and 74, an end portion opposite to a fixed side in the sheet member 90 is pressed by the other one of the end portions 72 and 74 to be in contact therewith, due to elasticity (resilience) of the sheet member 90.

In the modification illustrated in FIGS. 20 and 21 as well as the above-described embodiment, the blocking member is used to block the opening portion 64 of the bent section 62. However, as illustrated in FIG. 22, the opening portion 64 of the bent section 62 may be closed by contacting the pair of end portions 72 and 74 of the bent section 62 on the opening portion 64 side with each other.

Figure 22:
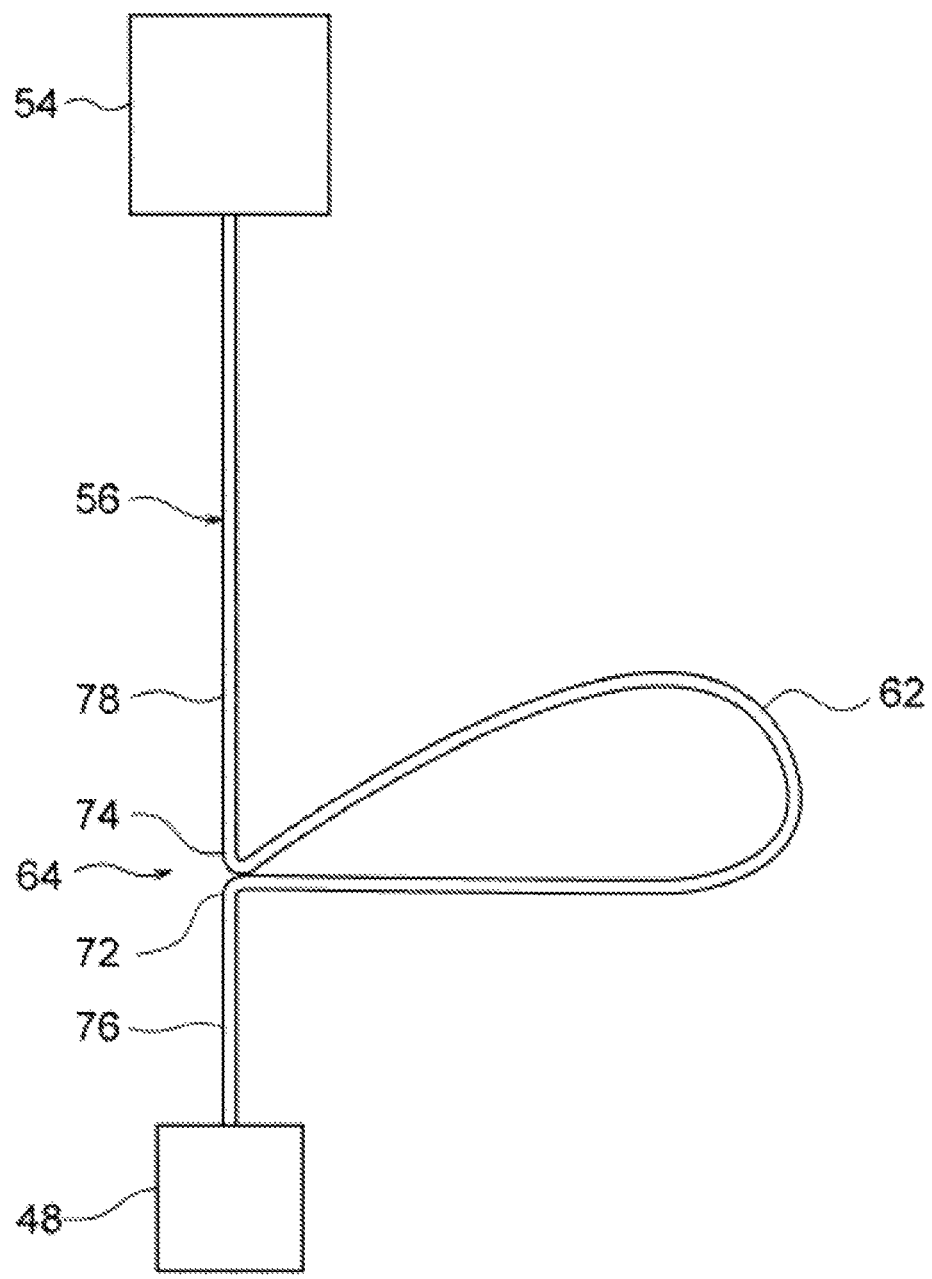
FIG. 22 is a side view illustrating a bent section according to another modification example.
Figure 23:
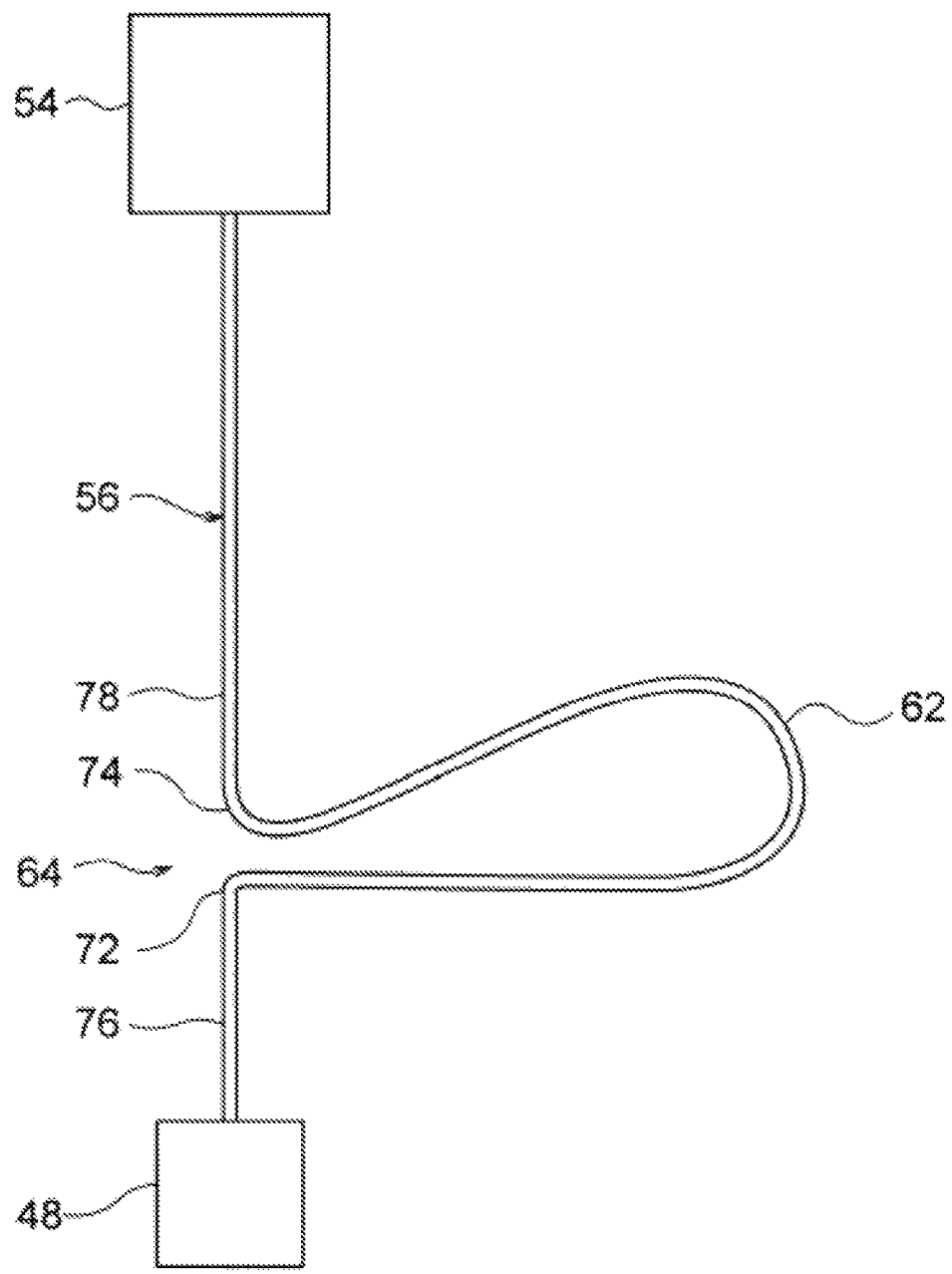
FIG. 23 is a side view illustrating a bent section according to yet another modification example.

Further, in the modification illustrated in FIGS. 20 to 22 and the above-described embodiment, the opening portion 64 of the bent section 62 is blocked or closed, but the opening portion 64 of the bent section 62 may be open as illustrated in FIG. 23.

In addition, at the time of making the wiring of the connection cable 44, the upper case 30 and the lower case 32 are in the state of being opened using the respective back-face sides as the respective supporting points, but may each be in a state of being opened using any point as a supporting point.

Moreover, in the state where the upper case 30 and the lower case 32 are opened, the connection cable 44 may be wired to straddle any edge portion of each of the upper case 30 and the lower case 32.

The connector 40 and the flexible cable 56 including the bent section 62 are disposed on the one edge portion 58 side (the back-face side) in the upper case 30, but may be disposed at any position in the upper case 30. Similarly, the pair of speakers 36 and 38 are also unevenly disposed at the edge portion 60 side (the back-face side) of the lower case 32, relative to the central part in the front-back direction of the lower case 32, but may be disposed at any position in the lower case 32.

Figure 24:
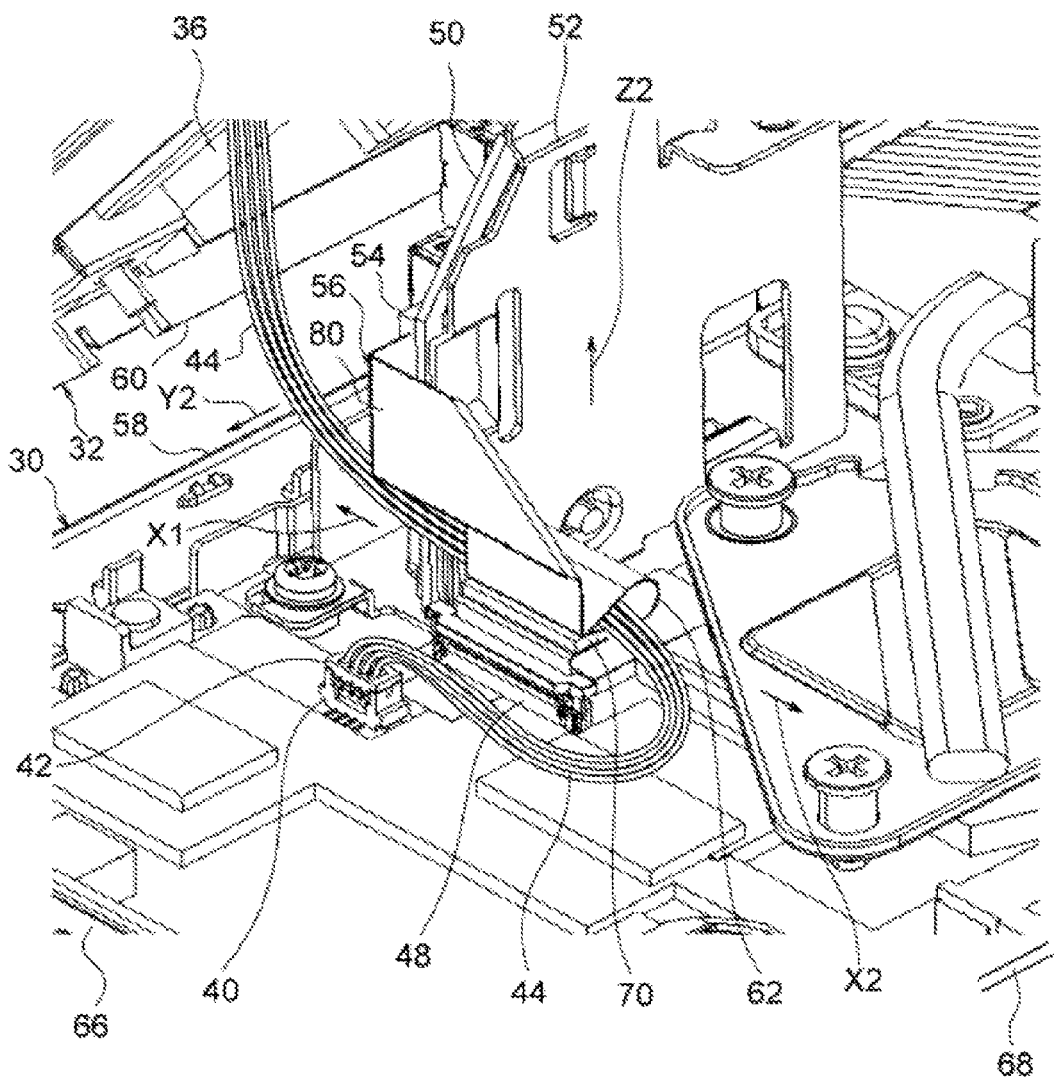
FIG. 24 is a perspective view illustrating a wiring root of a connection cable according to still another modification example.

As illustrated in FIG. 17, the connection cable 44 is wired to run toward the speaker 36 of the lower case 32, after being led out from the connector 40, and then passing through the inside of the bent section 62 from the one edge portion 58 side (the back-face side) toward the other edge portion 68 side (the front-face side) opposite thereto. However, as illustrated in FIG. 24, the connection cable 44 may be wired to run toward the speaker 36 of the lower case 32, after being led out from the connector 40, and then passing through the inside of the bent section 62 from the other edge portion 68 side (the front-face side) toward the one edge portion 58 side (the back-face side) opposite thereto.

The opening portion 64 of the bent section 62 faces in the direction toward the side face 66 of the upper case 30. However, the opening portion 64 of the bent section 62 may face in a direction other than the direction toward the side face 66 of the upper case 30, by using this direction as an example of the direction intersecting the separation direction of the upper case 30 and the lower case 32.

The electronic apparatus 10 has been described by using, as an example, a display-integrated personal computer. However, the electronic apparatus 10 may be any type of apparatus (for example, a mobile phone, a smartphone, a tablet, a laptop personal computer, a desktop personal computer, and the like) other than the display-integrated personal computer.

Any of the above-described modifications may be combined as appropriate, if combinable.

The one embodiment of the technique disclosed by the present application has been described above. However, the technique disclosed by the present application is not limited to the above-described embodiment, and may be, as a matter of course, implemented in various modifications in a range not departing from the gist thereof, other than those described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus comprising:
a first case and a second case assembled to each other;
a first cable that couples a first component provided in the first case and a second component provided in the second case; and
a second cable that couples a pair of members provided in the first case, and provided with a bent section at an intermediate part of the second cable in a longitudinal direction thereof, the second cable supporting the first cable inside the bent section,
wherein
the second cable includes:
a first led-out section that is led out from one of a pair of end portions of the bent section on an opening portion side, in a direction opposite to the other one of the pair of end portions; and
a second led-out section that is led out from the other one of the pair of end portions of the bent section on the opening portion side, in a direction opposite to the one of the pair of end portions,
a leading end of the first led-out section is coupled to one of the pair of members, and the first led-out section is shorter in length than the second led-out section.

2. The electronic apparatus according to claim 1,
wherein the second cable is a flexible cable, and
the bent section is bent to U-shape using a width direction of the flexible cable as an axis.

3. The electronic apparatus according to claim 1,
wherein the pair of members are disposed away from each other, and
the bent section is formed at an intermediate point in a clearance direction of the pair of members.

4. The electronic apparatus according to claim 1,
wherein an opening portion of the bent section is provided with a blocking member that blocks the opening portion.

5. The electronic apparatus according to claim 4,
wherein the blocking member is a block-shaped sponge member.

6. The electronic apparatus according to claim 5,
wherein the sponge member is pressed from both sides thereof by a pair of end portions of the bent section on an opening portion side.

7. The electronic apparatus according to claim 4,
wherein the blocking member is a sheet member that couples a pair of end portions of the bent section on an opening portion side.

8. The electronic apparatus according to claim 7,
wherein the sheet member couples, in a state of being bent, the pair of end portions of the bent section on the opening portion side.

9. The electronic apparatus according to claim 1,
wherein an opening portion of the bent section is closed by contacting a pair of end portions of the bent section on an opening portion side with each other.

10. The electronic apparatus according to claim 1,
wherein the second cable has a led-out section that is led out from one of a pair of end portions of the bent section on an opening portion side, in a direction opposite to the other one of the pair of end portions, and
a leading end of the led-out section is coupled to one of the pair of members.

11. An electronic apparatus comprising:
a first case and a second case assembled to each other;
a first cable that couples a first component provided in the first case and a second component provided in the second case; and
a second cable that couples a pair of members provided in the first case, and provided with a bent section at an intermediate part of the second cable in a longitudinal direction thereof, the second cable supporting the first cable inside the bent section,
wherein the second cable includes:
a first led-out section that is led out from one of a pair of end portions of the bent section on an opening portion side, in a direction opposite to the other one of the pair of end portions;
a second led-out section that is led out from the other one of the pair of end portions of the bent section on the opening portion side, in a direction opposite to the one of the pair of end portions, and a folded-back section that is folded back at a leading end of the second led-out section, toward a side opposite to a side where the bent section protrudes relative to the second led-out section.

12. The electronic apparatus according to claim 11,
wherein the folded-back section is twisted relative to the second led-out section by being folded toward a side of the second led-out section.

13. The electronic apparatus according to claim 1,
wherein the bent section and at least one of the first component and the second component are disposed on an edge portion side of peripheral edges of the first case and the second case.

14. The electronic apparatus according to claim 13,
wherein the bent section is formed with a width direction aligned with a direction in which the one edge portion of the peripheral part of the first case and the other edge portion opposite to the one edge portion are arranged side by side, and the first cable is led out from the first component, passes through inside of the bent section from the one edge portion side to the other edge portion side and runs toward the second component.

15. The electronic apparatus according to claim 13,
wherein the bent section is formed with a width direction aligned with a direction in which the one edge portion of the peripheral part of the first case and the other edge portion opposite to the one edge portion are arranged side by side, and the first cable is led out from the first component, passes through inside of the bent section from the other edge portion side to the one edge portion side and runs toward the second component.

16. The electronic apparatus according to claim 1,
wherein an opening portion of the bent section faces in a direction intersecting a separation direction of the first case and the second case.

17. The electronic apparatus according to claim 16,
wherein the first cable is led out from the inside of the bent section in a direction opposite to the first case in the separation direction.

18. A method of manufacturing the electronic apparatus of claim 1, the method comprising:

in a state where the first case and the second case are opened, coupling the first component provided in the first case and the second component provided in the second case by using the first cable, and coupling the pair of members provided in the first case by using the second cable; and assembling the first case and the second case to each other in a state where the first cable is held inside the bent section formed at the intermediate part of the second cable in the longitudinal direction.

19. The method according claim 18, further comprising:
supporting the first cable inside the bent section which is bent to U-shape, and blocking an opening portion of the bent section with a blocking member.

* * * * *